US012224098B2

(12) United States Patent
Ji et al.

(10) Patent No.: US 12,224,098 B2
(45) Date of Patent: Feb. 11, 2025

(54) MULTI-PHASE COUPLED INDUCTOR, MULTI-PHASE COUPLED INDUCTOR ARRAY AND TWO-PHASE INVERSE COUPLED INDUCTOR

(71) Applicant: Delta Electronics (Shanghai) Co., Ltd., Shanghai (CN)

(72) Inventors: Pengkai Ji, Shanghai (CN); Jinping Zhou, Shanghai (CN); Mingzhun Zhang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 896 days.

(21) Appl. No.: 17/105,650

(22) Filed: Nov. 27, 2020

(65) Prior Publication Data

US 2021/0210271 A1 Jul. 8, 2021

(30) Foreign Application Priority Data

Jan. 8, 2020 (CN) ......................... 202010018831.7

(51) Int. Cl.
*H01F 27/24* (2006.01)
*H01F 27/28* (2006.01)
*H01F 27/29* (2006.01)

(52) U.S. Cl.
CPC ............. *H01F 27/28* (2013.01); *H01F 27/24* (2013.01); *H01F 27/2895* (2013.01); *H01F 27/29* (2013.01)

(58) Field of Classification Search
CPC ....................................................... H01F 27/28
USPC .......................................................... 336/212
See application file for complete search history.

(56) References Cited

U.S. PATENT DOCUMENTS

| | | | | |
|---|---|---|---|---|
| 5,798,567 | A | 8/1998 | Kelly et al. | |
| 6,225,702 | B1 | 5/2001 | Nakamura | |
| 6,346,679 | B1 | 2/2002 | Nakamura | |
| 6,362,986 | B1 | 3/2002 | Schultz et al. | |
| 6,479,758 | B1 | 11/2002 | Arima et al. | |
| 6,740,965 | B2 | 5/2004 | Hsu et al. | |
| 7,449,799 | B2 * | 11/2008 | Levin | H02J 3/01 336/212 |
| 8,395,404 | B2 | 3/2013 | Kaku | |
| 10,395,819 | B2 | 8/2019 | Wukovits et al. | |

(Continued)

FOREIGN PATENT DOCUMENTS

| | | | |
|---|---|---|---|
| CA | 2647863 | A1 | 7/2009 |
| CN | 101211792 | A | 7/2008 |

(Continued)

OTHER PUBLICATIONS

English translation of JP2012124977 (Year: 2012).*

*Primary Examiner* — Ronald Hinson
(74) *Attorney, Agent, or Firm* — CKC & Partners Co., LLC

(57) ABSTRACT

The present disclosure provides a multi-phase coupled inductor, a multi-phase coupled inductor array and a two-phase inverse coupled inductor. The multi-phase coupled inductor includes a magnetic core having longitudinal middle columns and windings respectively wound around the longitudinal middle columns. A magnetic flux direction of a DC magnetic flux generated by a current flowing through any one of the windings is opposite to a magnetic flux direction of a DC magnetic flux generated by a current flowing through other one of the windings, on the longitudinal middle column corresponding to the other one of the windings.

15 Claims, 33 Drawing Sheets

(56) References Cited

U.S. PATENT DOCUMENTS

| | | | |
|---|---|---|---|
| 2004/0027813 | A1 | 2/2004 | Li |
| 2005/0169033 | A1 | 8/2005 | Sugita et al. |
| 2005/0274982 | A1 | 12/2005 | Ueda et al. |
| 2006/0181857 | A1 | 8/2006 | Belady et al. |
| 2007/0045815 | A1 | 3/2007 | Urashima et al. |
| 2007/0188997 | A1 | 8/2007 | Hockanson et al. |
| 2009/0290316 | A1 | 11/2009 | Kariya |
| 2010/0258952 | A1 | 10/2010 | Fjelstad |
| 2011/0080717 | A1 | 4/2011 | Koide et al. |
| 2014/0133115 | A1 | 5/2014 | Iguchi |
| 2014/0334121 | A1 | 11/2014 | Ito et al. |
| 2015/0054611 | A1* | 2/2015 | Cambronero Garcia .................... H01F 27/385 336/178 |
| 2015/0117862 | A1 | 4/2015 | Trotta et al. |
| 2016/0300659 | A1 | 10/2016 | Zhang et al. |
| 2016/0379952 | A1 | 12/2016 | Cahill et al. |
| 2017/0048963 | A1 | 2/2017 | Murakami |
| 2017/0069607 | A1 | 3/2017 | Yap |
| 2018/0032117 | A1 | 2/2018 | Leigh et al. |
| 2018/0076718 | A1 | 3/2018 | Zeng et al. |
| 2019/0074771 | A1 | 3/2019 | Zeng et al. |
| 2019/0254166 | A1 | 8/2019 | Ji et al. |
| 2019/0320554 | A1 | 10/2019 | Nakajima et al. |
| 2020/0211977 | A1 | 7/2020 | Kim et al. |

FOREIGN PATENT DOCUMENTS

| | | | |
|---|---|---|---|
| CN | 103730434 | A | 4/2014 |
| CN | 103871716 | A | 6/2014 |
| CN | 104112727 | A | 10/2014 |
| CN | 102576593 | B | 12/2014 |
| CN | 105449987 | A | 3/2016 |
| CN | 107154385 | A | 9/2017 |
| CN | 206726916 | U | 12/2017 |
| CN | 107545974 | A | 1/2018 |
| CN | 108962556 | A | 12/2018 |
| CN | 110112905 | A | 8/2019 |
| IN | 201914054517 | A | 7/2020 |
| IN | 202014000536 | A | 7/2020 |
| JP | H097862 | A | 1/1997 |
| JP | 2019079943 | A | 5/2019 |

* cited by examiner

MULTI-PHASE COUPLED INDUCTOR, MULTI-PHASE COUPLED INDUCTOR ARRAY AND TWO-PHASE INVERSE COUPLED INDUCTOR

CROSS-REFERENCE TO RELATED APPLICATIONS

This non-provisional application claims priority under 35 U.S.C. § 119(a) on Patent Application No. 202010018831.7 filed in P.R. China on Jan. 8, 2020, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

BACKGROUND

1. Technical Field

The present invention relates to a coupled inductor, and particularly, to a multi-phase coupled inductor, a multi-phase coupled inductor array and a two-phase inverse coupled inductor.

2. Related Art

Currently, a market size of a cloud (data center) and a terminal (mobile phone, tablet, etc.) is increasing rapidly. However, the challenges are also increasing, for example, as the increase of the functions of various intelligent ICs, the power consumption, and the number of devices on the main board are increasing, it is required that the power supply module has a higher power density, or a single power supply module has a larger current output capability. In addition, as the promotion of computing capability of the intelligent ICs, a requirement for dynamic performance of the power supply module becomes higher. Multi-phase parallel power supply is an effective solution for large current power supply. When both of high efficiency and high dynamic performance are required, inverse coupling is a good solution. Among others, inverse coupled inductor is an essential element for achieving inverse coupling.

The inductor is an electronic component commonly used in an integrated circuit, and may convert electric energy into magnetic energy for storage. The coupled inductor may separate the dynamic inductance amount from the static inductance amount. The coupled inductor may have a smaller inductance amount and an increased response speed in dynamic, while have a larger inductance amount and a reduced ripple current in static, to take into account characteristics of high response speed in dynamic and small ripple current in static. In addition, a volume of the inductor may be reduced or an efficiency of the inductor may be improved through the magnetic integration and an counteract effect of reverse magnetic flux. The multi-phase coupled inductor may further improve the efficiency, reduce the volume and improve the dynamic performance for the power supply module, and may further reduce the number of output capacitors required by the power supply module.

However, one of the available inductors having a structure capable of realizing multi-phase inverse coupling may have a large difference between a coupling inductance amount of the phases at both ends and a coupling inductance amount of the phase at the center, and a large difference between the coupling of the adjacent phases and the coupling of the nonadjacent phases, such that the symmetry between the multiple phases is poor.

Therefore, it is urgent to develop a multi-phase coupled inductor capable of solving at least one of the above deficiencies.

SUMMARY

An object of the present invention is to provide a multi-phase coupled inductor, a multi-phase coupled inductor array and a two-phase inverse coupled inductor, which can solve at least one of the above deficiencies.

To achieve the above object, embodiments of the present invention provides a multi-phase coupled inductor, comprising: a magnetic core comprising two first horizontal columns, at least one longitudinal side column and a plurality of longitudinal middle columns, wherein the plurality of longitudinal middle columns comprise at least two first longitudinal middle columns and at least one second longitudinal middle column, the longitudinal side column is connected to the two first horizontal columns, a first end of each of the first longitudinal middle columns is connected to one of the two first horizontal columns, a first end of the second longitudinal middle column is connected to other one of the two first horizontal columns, and a second end of each of the first longitudinal middle columns is connected to a second end of the second longitudinal middle column; and a plurality of windings comprising at least two first windings respectively wound around the at least two first longitudinal middle columns, and at least one second winding respectively wound around the at least one second longitudinal middle column, wherein a magnetic flux direction of a DC magnetic flux generated by a current flowing through any one of the windings is opposite to a magnetic flux direction of a DC magnetic flux generated by a current flowing through other one of the windings, on the longitudinal middle column corresponding to the other one of the windings.

In one embodiment of the present invention, the magnetic core comprises two longitudinal side columns symmetrically disposed at left and right ends of the two first horizontal columns.

In one embodiment of the present invention, the magnetic core further comprises a second horizontal column disposed between the two first horizontal columns, and the second end of each of the first longitudinal middle columns is connected to the second end of the second longitudinal middle column through the second horizontal column.

In one embodiment of the present invention, a first air gap is disposed on a first magnetic path from the second horizontal column to the one of the two first horizontal columns via the first longitudinal middle column; and/or a second air gap is disposed on a second magnetic path from the second horizontal column to the other one of the two first horizontal columns via the second longitudinal middle column.

In one embodiment of the present invention, the magnetic core further comprises: a first decoupling column connected to the second horizontal column and disposed between the two first horizontal columns, wherein a third air gap is disposed on a third magnetic path from the second horizontal column to the two first horizontal columns via the first decoupling column; and/or a second decoupling column connected to the second horizontal column and disposed between the at least one longitudinal side column and the second horizontal column, wherein a fourth air gap is disposed on a fourth magnetic path from the second horizontal column to the at least one longitudinal side column via the second decoupling column.

In one embodiment of the present invention, a magnetic permeability of each of the first longitudinal middle columns and the second longitudinal middle column is smaller than a magnetic permeability of at least one of other portions of the magnetic core.

In one embodiment of the present invention, the magnetic core further comprises a decoupling plate stacked with the two first horizontal columns in a vertical direction, and the vertical direction is orthogonal to a horizontal direction and a longitudinal direction, wherein a fifth air gap is disposed between the decoupling plate and the two first horizontal columns; and/or a sixth air gap is disposed between the decoupling plate and the at least one longitudinal side column; and/or a seventh air gap is disposed between the decoupling plate and the second horizontal column.

In one embodiment of the present invention, the at least two first longitudinal middle columns and the at least one second longitudinal middle column are staggered or aligned with each other with respect to the second horizontal column.

In one embodiment of the present invention, the magnetic core comprises one longitudinal side column having a plate shape, and the longitudinal side column is stacked with the two first horizontal columns in a vertical direction; the one of the two first horizontal columns is stacked between the longitudinal side column and the first longitudinal middle column; and the other one of the two first horizontal columns is stacked between the longitudinal side column and the second longitudinal middle column.

In one embodiment of the present invention, terminals on both ends of each of the first windings are extended to an upper surface and a lower surface of the magnetic core in a vertical direction, respectively; and/or terminals on both ends of the second winding are extended to the upper surface and the lower surface of the magnetic core in the vertical direction, respectively.

In one embodiment of the present invention, among the plurality of windings, terminals of at least one of the windings are extended to an upper surface of the magnetic core in a vertical direction, and terminals of at least one of the windings are extended to a lower surface of the magnetic core in the vertical direction.

Embodiments of the present invention further provides a multi-phase coupled inductor array, comprising a magnetic core and a plurality of windings, the magnetic core comprising: N first horizontal columns; M second horizontal columns parallel to and staggered with the N first horizontal columns, wherein M≤N≤(M+1), M≥2, and N and M are both positive integers; at least one longitudinal side column connected to first ends of the N first horizontal columns; a first connection magnetic column connected to first ends of the M second horizontal columns; and a plurality of longitudinal middle columns comprising at least two first longitudinal middle columns and at least one second longitudinal middle column, wherein each of the first longitudinal middle columns is disposed between an ith first horizontal column and an ith second horizontal column, and the second longitudinal middle column is disposed between the ith second horizontal column and an (i+1)th first horizontal column, wherein i=1, . . . , and M, the plurality of windings comprising at least two first windings respectively wound around the first longitudinal middle columns and at least one second winding respectively wound around the at least one second longitudinal middle column, wherein a magnetic flux direction of a DC magnetic flux generated by a current flowing through any one of the windings is opposite to a magnetic flux direction of a DC magnetic flux generated by a current flowing through other one of the windings, on the longitudinal middle column corresponding to the other one of the windings.

In another embodiment of the present invention, the magnetic core comprises one longitudinal side column having a plate shape and stacked with the N first horizontal columns in a vertical direction, and a second connection magnetic column connected to a second end of each of the M second horizontal columns.

In another embodiment of the present invention, the first connection magnetic column has a plate shape and is stacked with the M second horizontal columns in a vertical direction.

Embodiments of the present invention still further provides a multi-phase coupled inductor array, comprising a plurality of the above multi-phase coupled inductors, the plurality of multi-phase coupled inductors are stacked in a vertical direction, first horizontal columns of the plurality of multi-phase coupled inductors are correspondingly connected together; and/or second horizontal columns of the plurality of multi-phase coupled inductors are correspondingly connected together; and/or longitudinal side columns of the plurality of multi-phase coupled inductors are correspondingly connected together.

Embodiments of the present invention even further provides a multi-phase coupled inductor array, comprising a magnetic core and a plurality of windings, the magnetic core comprising: P longitudinal columns comprising two edge longitudinal columns located in the edge of the magnetic core and a middle longitudinal column located in the middle of the magnetic core, wherein P is a positive integer larger than or equal to 3; N first horizontal columns and M second horizontal columns disposed between adjacent two longitudinal columns, wherein M≤N≤(M+1), M≥2, and N and M are both positive integers, wherein the first horizontal columns are spaced apart from the second horizontal columns, the two edge longitudinal columns are connected to and perpendicular to the first horizontal columns and the second horizontal columns, respectively, the two edge longitudinal columns are connected to each other at one end through a first horizontal side column, and both sides of the middle longitudinal column are connected to and perpendicular to the first horizontal columns and the second horizontal columns, respectively; and a plurality of longitudinal middle columns disposed between adjacent two longitudinal columns, and comprising at least two first longitudinal middle columns and at least one second longitudinal middle column, wherein each of the first longitudinal middle columns is disposed between an ith first horizontal column and an ith second horizontal column, and the second longitudinal middle column is disposed between the ith second horizontal column and an (i+1)th first horizontal column, wherein i=1, . . . , and M, the plurality of windings comprising at least two first windings respectively wound around the at least two first longitudinal middle columns and at least one second winding respectively wound around the at least one second longitudinal middle column, wherein a magnetic flux direction of a DC magnetic flux generated by a current flowing through any one of the windings is opposite to a magnetic flux direction of a DC magnetic flux generated by a current flowing through other one of the windings, on the longitudinal middle column corresponding to the other one of the windings.

In even further embodiment of the present invention, the first horizontal columns and the second horizontal columns are spaced apart from each other in a horizontal direction and a longitudinal direction, respectively, and the first horizontal columns are staggered with the second horizontal columns in the longitudinal direction.

In even further embodiment of the present invention, the two edge longitudinal columns are connected to each other at other end through a second horizontal side column.

Embodiments of the present invention further provides a two-phase inverse coupled inductor, comprising: a magnetic core comprising two first horizontal columns, one longitudinal side column and a plurality of longitudinal middle columns, wherein the plurality of longitudinal middle columns comprise one first longitudinal middle column and one second longitudinal middle column, the longitudinal side column is connected to the two first horizontal columns, a first end of the first longitudinal middle column is connected to one of the two first horizontal columns, a first end of the second longitudinal middle column is connected to other one of the two first horizontal columns, a second end of the first longitudinal middle column is connected to a second end of the second longitudinal middle column, and the longitudinal side column is stacked with the two first horizontal columns in a vertical direction; and a plurality of windings comprising a first winding and a second winding, wherein the first winding is wound around the first longitudinal middle column, and the second winding is wound around the second longitudinal middle column; or wherein the first winding is wound around the first longitudinal middle column and then wound around the longitudinal side column by crossing of the first winding, and the second winding is wound around the second longitudinal middle column and then wound around the longitudinal side column by crossing of the second winding; wherein a magnetic flux direction of a DC magnetic flux generated by a current flowing through any one of the windings is opposite to a magnetic flux direction of a DC magnetic flux generated by a current flowing through other one of the windings, on the longitudinal middle column corresponding to the other one of the windings.

In even further embodiment of the present invention, the one of the two first horizontal columns is stacked between the longitudinal side column and the first longitudinal middle column; and the other one of the two first horizontal columns is stacked between the longitudinal side column and the second longitudinal middle column.

Embodiments of the present invention may at least have one or more advantages in: (1) a short magnetic path and a small footprint for improving power density and efficiency; (2) arrangement of windings in the array for achieving the multi-phase inverse coupling and the uniformity of the coupling strength and the inductance amount between the phases; (3) suitable for a module of stacked structure and facilitating heat dissipation in a vertical direction; (4) a simple structure and good manufacturability; (5) suitable for both of a ferrite material and a powder core material.

BRIEF DESCRIPTION OF THE DRAWINGS

The above and other objects, features and advantages of the embodiments of present invention will become obvious from the detailed description with reference to the accompanying drawings. In the drawings, several embodiments of the present invention are explained as non-limited examples, wherein.

DETAILED EMBODIMENTS

Figure 1A:
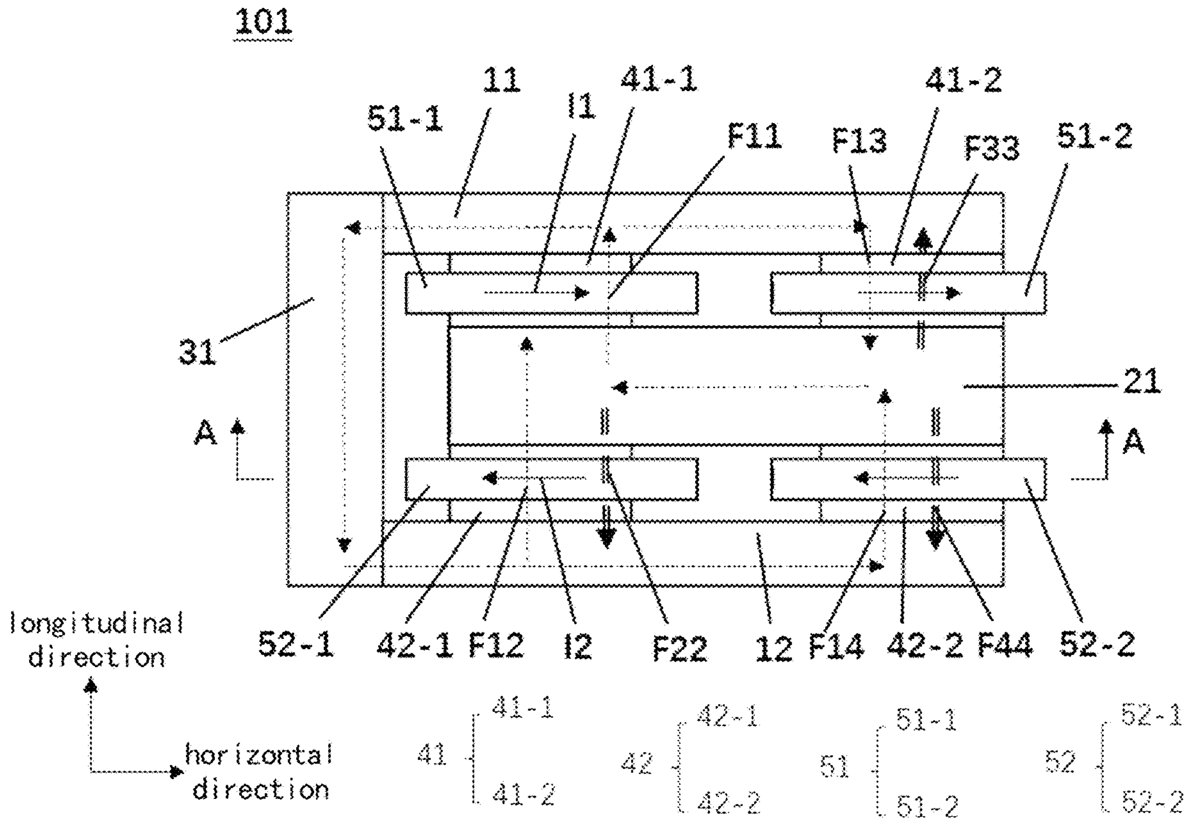
FIG. 1A is a structural diagram of a multi-phase coupled inductor according to a first embodiment of the present invention.

Hereinafter, the embodiments of the present invention will be described in detail, and the embodiments are exemplarily illustrated in the accompanying drawings, where the same or similar reference sign represents the same or similar element or element having the same or similar function. The embodiments described with reference to the accompanying drawings are exemplary and are provided for explaining the present invention, but should not be construed as a limitation to the present invention.

In the disclosure of the present invention, it should be understood that the terms indicating the direction or position such as upper, lower, front, back, left, right, vertical, horizontal, top, bottom, inside, outside and the like are based on the direction or position shown in the accompanying drawings, and are provided only for the purpose of describing the present invention and simplifying the description, rather than indicating that any device or element must have specific orientation or must be configured and operated in specific orientation, so these terms cannot be construed as a limitation to the present invention.

In addition, the terms "first" and "second" are merely provided for the purpose of description, but should not be construed as indicating the priority or number of the features. Accordingly, the features defined by "first" and "second" may explicitly or implicitly comprise at least one of the features. In the disclosure of the present invention, "a plurality of" means at least two, such as two, three or the like, unless the context expressly defines otherwise. In the disclosure of the present invention, "multi-phase" means at least two phases, such as two-phase, three-phase or the like, unless the context expressly defines otherwise.

In the present invention, unless the context expressly defines otherwise, the term "connect" and the like should be construed generally as, for example, fixedly connection, detachably connection, or integrally connection; directly connection, indirectly connection through an intermediate medium; and communication between two elements or interaction between two elements. For example, in the disclosure of the present invention, the term "connect" can be construed as direct connection between the two elements or connection between two elements through a magnetic flux with an air gap therebetween. For those having ordinary skill in the art, the specific meaning of the term in the present invention can be understood according to specific situations.

In the disclosure of the specification, the term "one embodiment", "some embodiments", "example", "specific example", or "some examples" means that the specific feature, structure, material or characteristic described combining with the embodiment or example is included in at least one embodiment or example of the present invention. In the specification, the exemplary expression of the above term does not necessarily refer to the same embodiment or example. Moreover, the specific feature, structure, material or characteristic can be combined appropriately in any one or more embodiments or examples. In addition, those having ordinary skill in the art can combine and group different embodiments or examples, and features in different embodiments or examples without contradiction.

Embodiments of the present invention provides a multi-phase coupled inductor comprising a magnetic core and a plurality of windings. The magnetic core comprises two first horizontal columns, at least one longitudinal side column and a plurality of longitudinal middle columns. The plurality of longitudinal middle columns comprise at least two first longitudinal middle columns and at least one second longitudinal middle column. The longitudinal side column is connected to the two first horizontal columns, a first end of each of the first longitudinal middle columns is connected to one of the two first horizontal columns, a first end of the second longitudinal middle column is connected to other one of the two first horizontal columns, and a second end of each of the first longitudinal middle columns is connected to a second end of the second longitudinal middle column. The plurality of windings comprise at least two first windings respectively wound around the at least two first longitudinal middle columns and at least one second winding respectively wound around the at least one second longitudinal middle column. A magnetic flux direction of a DC magnetic flux generated by a current flowing through any one of the windings is opposite to a magnetic flux direction of a DC magnetic flux generated by a current flowing through other one of the windings, on the longitudinal middle column corresponding to the other one of the windings.

Figure 1B:
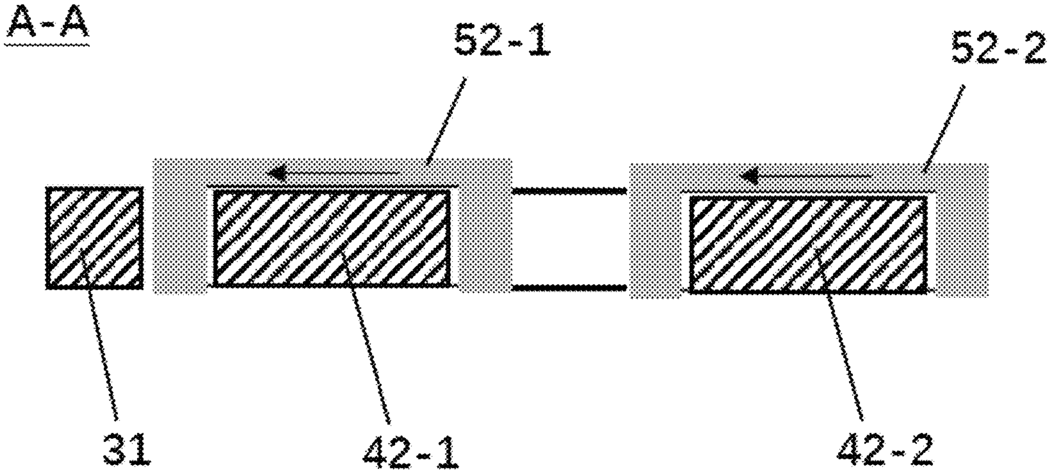
FIG. 1B is a sectional diagram along line A-A in FIG. 1A.

In embodiment of the present invention, as shown in FIGS. 1A and 1B, which illustrate a structure of a multi-phase coupled inductor 101 according to a first embodiment of the present invention, the multi-phase coupled inductor 101 comprises a magnetic core and four windings. The magnetic core comprises two first horizontal columns 11 and 12, one second horizontal column 21, one longitudinal side column 31, two first longitudinal middle columns 41 (41-1 and 41-2) and two second longitudinal middle columns 42 (42-1 and 42-2). The two first horizontal columns 11 and 12 are opposite and parallel to each other. The longitudinal side column 31 is connected to the two first horizontal columns 11 and 12, such as, connected to first ends of the two first horizontal columns 11 and 12. A first end of each of the first longitudinal middle columns 41 is connected to the first horizontal column 11, a first end of each of the second longitudinal middle columns 42 is connected to the first horizontal column 12, and a second end of each of the first longitudinal middle columns 41 is connected to a second end of the second longitudinal middle column 42, such as through the second horizontal column 21. The four windings comprise two first windings 51 (51-1 and 51-2) wound around the two first longitudinal middle columns 41, respectively, and two second windings 52 (52-1 and 52-2) wound around the two second longitudinal middle columns 42, respectively. That is, one of the first windings 51 is wound around one of the first longitudinal middle columns 41, and other one of the first windings 51 is wound around other one of the first longitudinal middle columns 41. One of the second windings 52 is wound around one of the second longitudinal middle columns 42, and other one of the second windings 52 is wound around other one of the second longitudinal middle columns 42. In addition, a current flowing through each of the four windings generates a DC magnetic flux. For example, in FIG. 1A, a direction of a current I1 flowing through the first winding 51 is the right direction, and a direction of a current I2 flowing through the second winding 52 is the left direction. Correspondingly, the DC magnetic flux generated by the current I1 flowing through the first winding 51 has a first direction (e.g., upward direction) on the corresponding first longitudinal middle columns 41. That is, the DC magnetic flux generated by the current flowing through the first winding 51-1 at the left side has the first direction on the first longitudinal middle column 41-1 at the left side, around which the first winding 51-1 is wound, and the DC magnetic flux generated by the current flowing through the first winding 51-2 at the right side has the first direction on the first longitudinal middle column 41-2 at the right side, around which the first winding 51-2 is wound. The DC magnetic flux generated by the current flowing through the second winding 52 has a second direction (e.g., downward direction) on the corresponding second longitudinal middle columns 42. That is, the DC magnetic flux generated by the current flowing through the second winding 52-1 at the left side has the second direction on the second longitudinal middle column 42-1 at the left side, around which the second winding 52-1 is wound, and the DC magnetic flux generated by the current flowing through the second winding 52-2 at the right side has the second direction on the second longitudinal middle column 42-2 at the right side, around which the second winding 52-2 is wound. The first direction is opposite to the second direction.

As shown in FIG. 1A, the DC magnetic flux generated by the current flowing through the first winding 51-1 wound around the first longitudinal middle column 41-1 is shown by a single dashed arrow, and the DC magnetic flux generated by the current flowing through other winding (e.g., the first winding 51-2, the second winding 52-1 and the second winding 52-2) wound around other longitudinal middle column (e.g., the first longitudinal middle column 41-2, the second longitudinal middle column 42-1 and the second longitudinal middle column 42-2) has a magnetic flux direction on the corresponding longitudinal middle column as shown by a double dashed arrow. F11 indicates a magnetic flux direction, on the first longitudinal middle column 41-1, of the DC magnetic flux generated by the first winding 51-1, F12 indicates a magnetic flux direction, on the second longitudinal middle column 42-1, of the DC magnetic flux generated by the first winding 51-1, and F22 indicates a magnetic flux direction, on the second longitudinal middle column 42-1, of the DC magnetic flux generated by the second winding 52-1 itself. F12 and F22 are opposite directions. That is, an inductor consisting of the first winding 51-1 and the first longitudinal middle column 41-1 and an inductor consisting of the second winding 52-1 and the second longitudinal middle column 42-1 form inverse coupled inductors (i.e., inverse coupled with each other). Similarly, F13 indicates a magnetic flux direction, on the first longitudinal middle column 41-2, of the DC magnetic flux generated by the first winding 51-1, and F33 indicates a magnetic flux direction, on the first longitudinal middle column 41-2, of the DC magnetic flux generated by the first winding 51-2 itself. F13 and F33 are opposite directions. That is, an inductor consisting of the first winding 51-1 and the first longitudinal middle column 41-1 and an inductor consisting of the first winding 51-2 and the first longitudinal middle column 41-2 form inverse coupled inductors. Similarly, F14 indicates a magnetic flux direction, on the second longitudinal middle column 42-2, of the DC magnetic flux generated by the first winding 51-1, and F44 indicates a magnetic flux direction, on the second longitudinal middle column 42-2, of the DC magnetic flux generated by the second winding 52-2 itself. F14 and F44 are opposite directions. That is, an inductor consisting of the first winding 51-1 and the first longitudinal middle column 41-1 and an inductor consisting of the second winding 52-2 and the second longitudinal middle column 42-2 form inverse coupled inductors. In other words, the inductor consisting of the first winding 51-1 and the first longitudinal middle column 41-1 and the inductor consisting of one of other three windings (the first winding 51-2, the second winding 52-1 and the second winding 52-2) and corresponding one of other three longitudinal middle columns (the first longitudinal middle column 41-2, the second longitudinal middle column 42-1 and the second longitudinal middle column 42-2) form inverse coupled inductors. The relative positions of the first longitudinal middle column 41-1 with respect to other three longitudinal middle columns are relative symmetric, such as the flux flow distance from the first longitudinal middle column 41-1 to respective other three longitudinal middle columns may be relative identical, and any one of the four longitudinal middle columns (41-1, 41-2, 42-1 and 42-2) form a inverse coupled inductors with other three longitudinal middle columns. That is, a magnetic flux direction of a DC magnetic flux generated by a current flowing through any one of the windings is opposite to a magnetic flux direction of a DC magnetic flux generated by a current flowing through other one of the windings, on the longitudinal middle column corresponding to the other one of the windings.

In this embodiment, as shown in FIGS. 1A and 1B, the first winding 51 and the second winding 52 each has one turn. However, it should be understood that the respective winding may have multiple turns according to actual application. In addition, FIG. 1A illustrates four longitudinal middle columns (two first longitudinal middle columns 41 and two second longitudinal middle columns 42) for forming a four-phase coupled inductor. That is, the four inductors formed by the four longitudinal middle columns and the corresponding windings are inverse coupled with each other. However, it should be understood that the number of phases of the coupled inductor can be adjusted according to actual application, and the present invention is not limited thereto. In this embodiment, the plurality of windings are arranged in a 2×2 array, and the two first longitudinal middle columns 41 and the two second longitudinal middle columns 42 are arranged in the array symmetrically with respect to the second horizontal column 21.

In the multi-phase coupled inductor according to embodiments of the present invention, the respective windings may be arranged in an array to achieve the multi-phase inverse coupling and the uniformity of coupling strength and inductance amount between phases. Moreover, since the phases may be coupled with each other in several paths, the magnetic path is short and the footprint is small, which improves the power density and efficiency of the inductor. The multi-phase coupled inductor according to embodiments of the present invention also has advantages of simple structure and good manufacturability. In addition, the magnetic core of the multi-phase coupled inductor according to embodiments of the present invention is suitable for both of a ferrite material and a powder core material, can be manufactured in various ways, and is adaptive to various applications. The multi-phase coupled inductor according to embodiments of the present invention has an array structure in which the windings are arranged vertically to improve the uniformity of the current of the respective windings, simplify the pins, facilitate the heat dissipation in the vertical direction, and is more suitable for application in electronic device module having stacked structure.

Figure 2A:
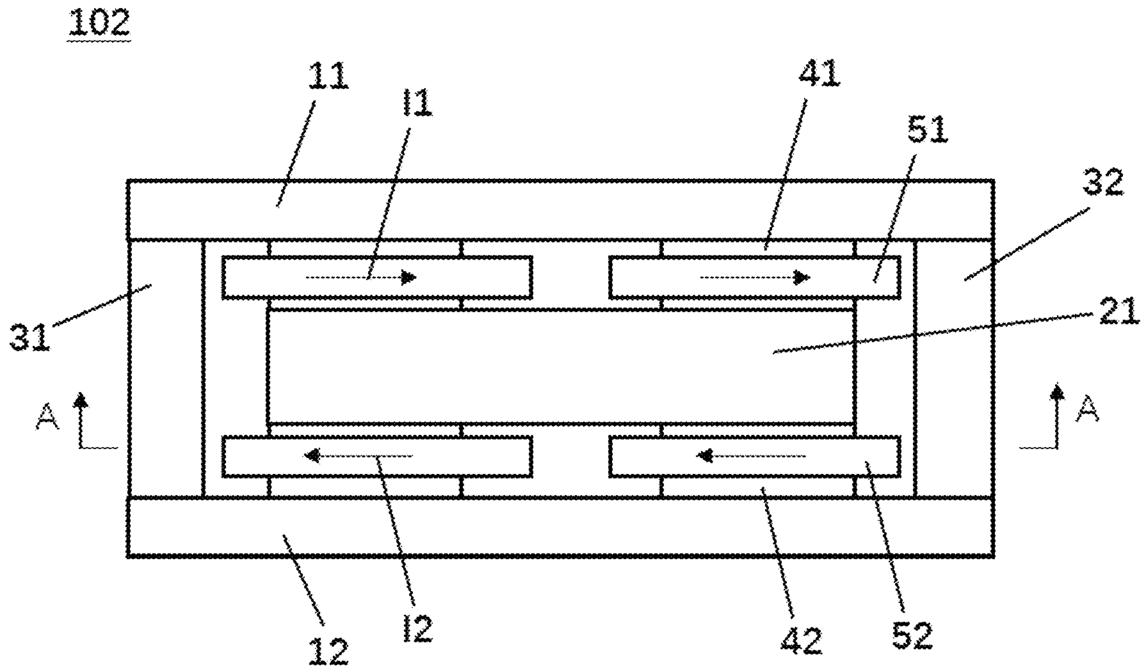
FIG. 2A is a structural diagram of a multi-phase coupled inductor having two longitudinal side columns according to a second embodiment of the present invention on the basis of the structure of FIG. 1A.
Figure 2B:
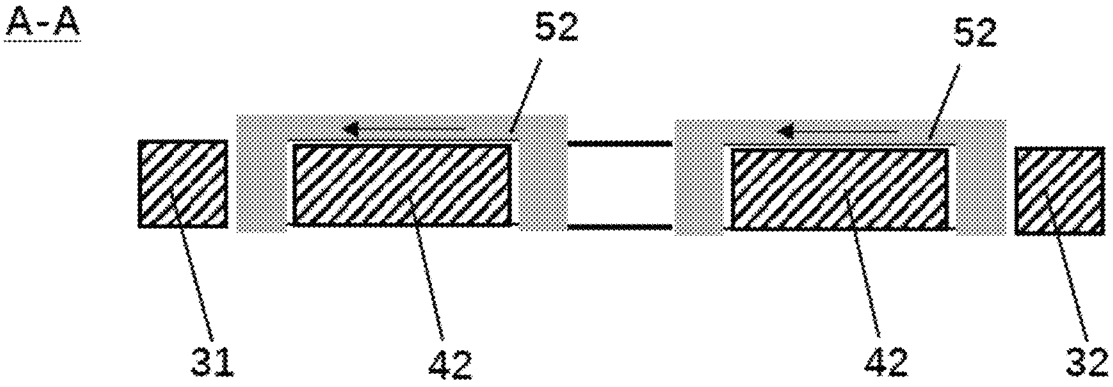
FIG. 2B is a sectional diagram along line A-A in FIG. 2A.

FIGS. 2A-2B are structural diagrams of a multi-phase coupled inductor 102 according to a second embodiment of the present invention, in which two longitudinal side columns are disposed on the basis of FIG. 1A. As shown in FIGS. 2A-2B, the two longitudinal side columns 31 and 32 are disposed at left and right sides, respectively, such as, symmetrically disposed at left and right ends of the two first horizontal columns 11 and 12. Such symmetrical structure improves the uniformity of the length of the coupled magnetic path between phases, thereby improving the uniformity of the coupling strength and the inductance amount between phases.

Figure 3A:
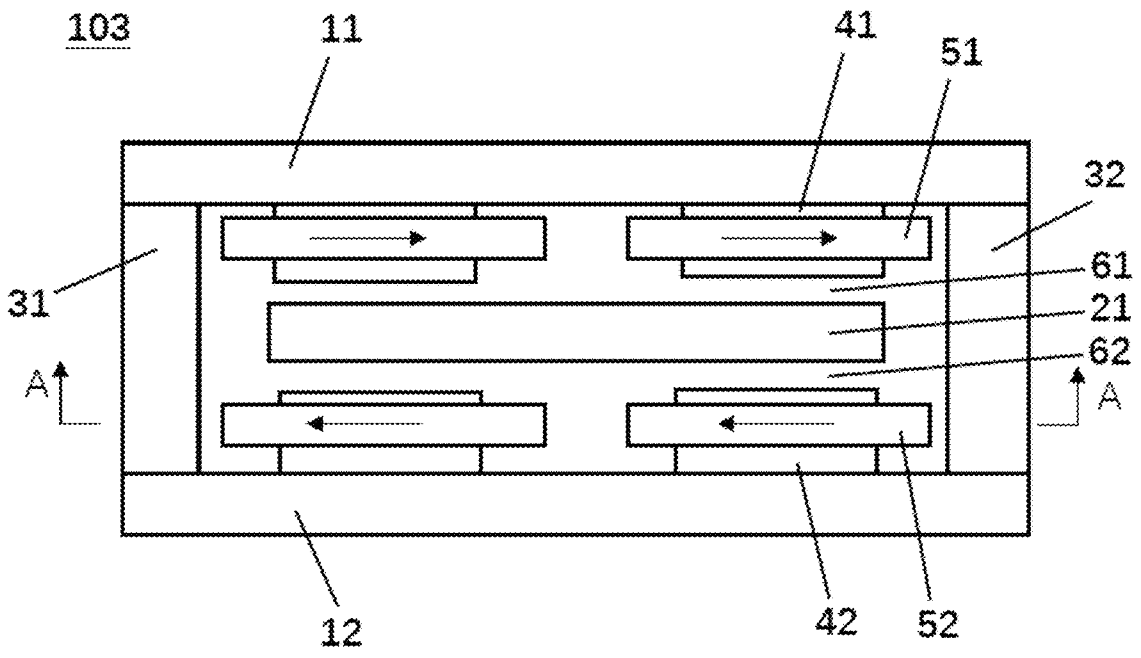
FIG. 3A is a structural diagram of a multi-phase coupled inductor having air gaps disposed on corresponding magnetic paths of a first longitudinal middle column and a second longitudinal middle column according to a third embodiment of the present invention on the basis of the structure of FIG. 2A.
Figure 3B:
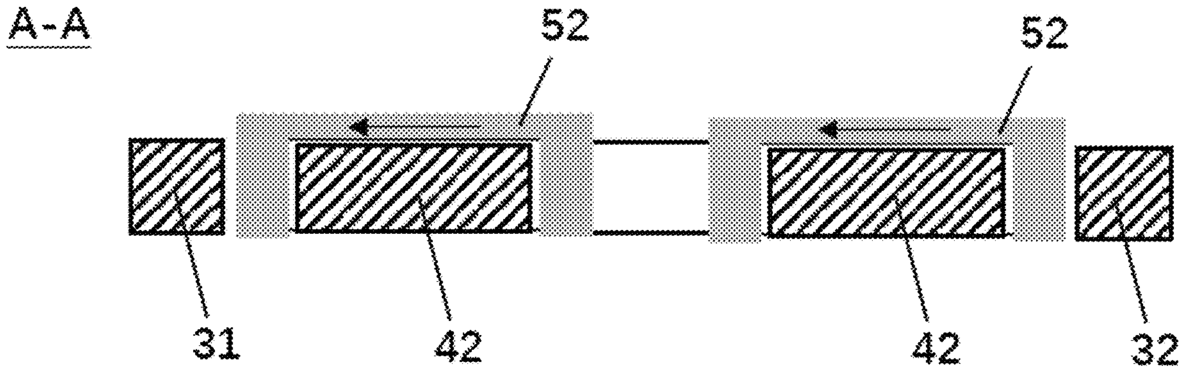
FIG. 3B is a sectional diagram along line A-A in FIG. 3A.

FIGS. 3A-3B are structural diagrams of a multi-phase coupled inductor 103 according to a third embodiment of the present invention, in which air gaps are disposed on the corresponding magnetic paths of the first longitudinal middle column 41 and the second longitudinal middle column 42 on the basis of FIG. 2A. For example, a first air gap 61 is disposed on a first magnetic path from the second horizontal column 21 to the first horizontal column 11 at the upper side via the first longitudinal middle columns 41; and/or a second air gap 62 is disposed on a second magnetic path from the second horizontal column 21 to the first horizontal column 12 at the lower side via the second longitudinal middle columns 42. As shown in FIG. 3A, which illustrates the first air gap 61 disposed between the first longitudinal middle columns 41 and the second horizontal column 21 and the second air gap 62 disposed between the second longitudinal middle columns 42 and the second horizontal column 21, the first air gap 61 and the second air gap 62 can adjust the inductance amount or saturation current for inductor of each phase.

Figure 3C:
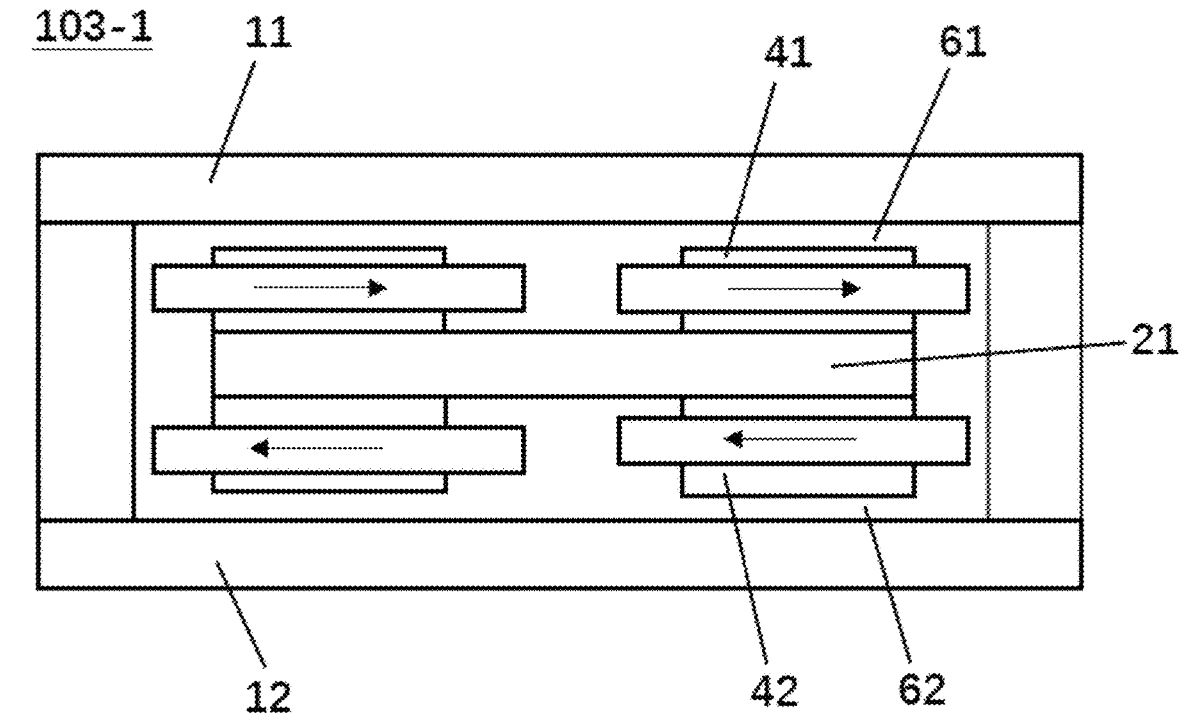
FIG. 3C illustrates a multi-phase coupled inductor according to a variable embodiment on the basis of the structure of FIG. 3A by changing the positions of the air gaps.

As shown in FIG. 3C, which illustrates a structure of a multi-phase coupled inductor 103-1 according to a variable embodiment on the basis of the structure of FIG. 3A by changing the positions of the air gaps, the first air gap 61 is disposed between the first longitudinal middle columns 41 and the first horizontal column 11 at the upper side, and the second air gap 62 is disposed between the second longitudinal middle columns 42 and the first horizontal column 12 at the lower side.

Figure 3D:
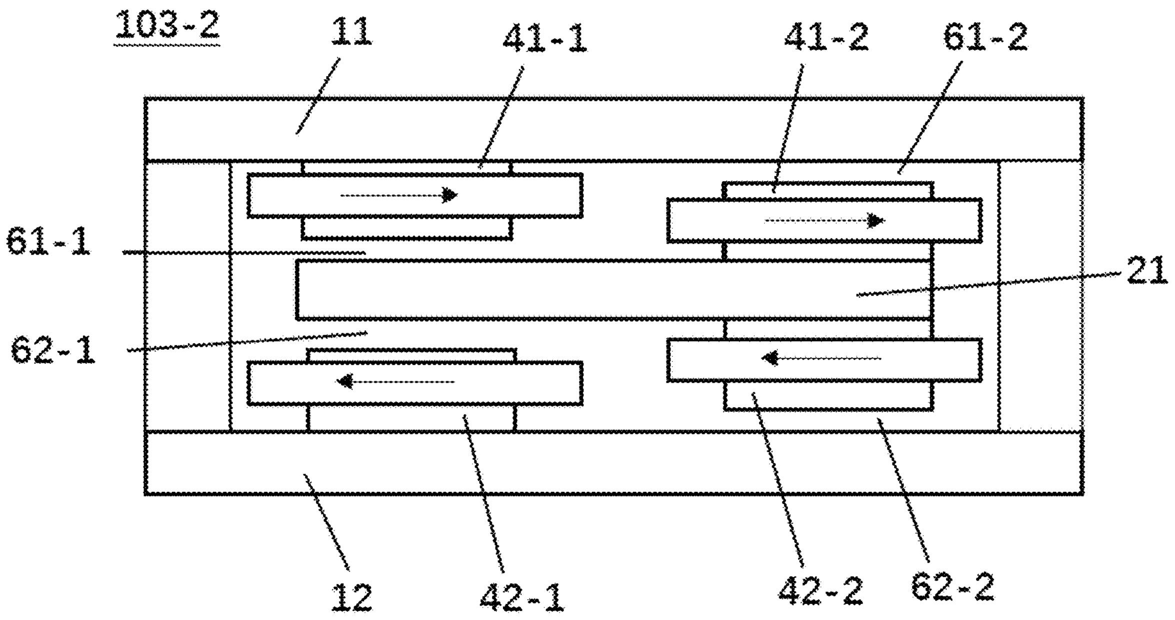
FIG. 3D illustrates a multi-phase coupled inductor according to another variable embodiment on the basis of the structure of FIG. 3A by changing the positions of the air gaps.

As shown in FIG. 3D, which illustrates a structure of a multi-phase coupled inductor 103-2 according to an another variable embodiment on the basis of the structure of FIG. 3A by changing the positions of the air gaps, for example, the first air gap 61-1 is disposed between the first longitudinal middle column 41-1 and the second horizontal column 21, the first air gap 61-2 is disposed between the first longitudinal middle column 41-2 and the first horizontal column 11 at the upper side, the second air gap 62-1 is disposed between the second longitudinal middle column 42-1 and the second horizontal column 21, and the second air gap 62-2 is disposed between the second longitudinal middle column 42-2 and the first horizontal column 12 at the lower side.

Figure 3E:
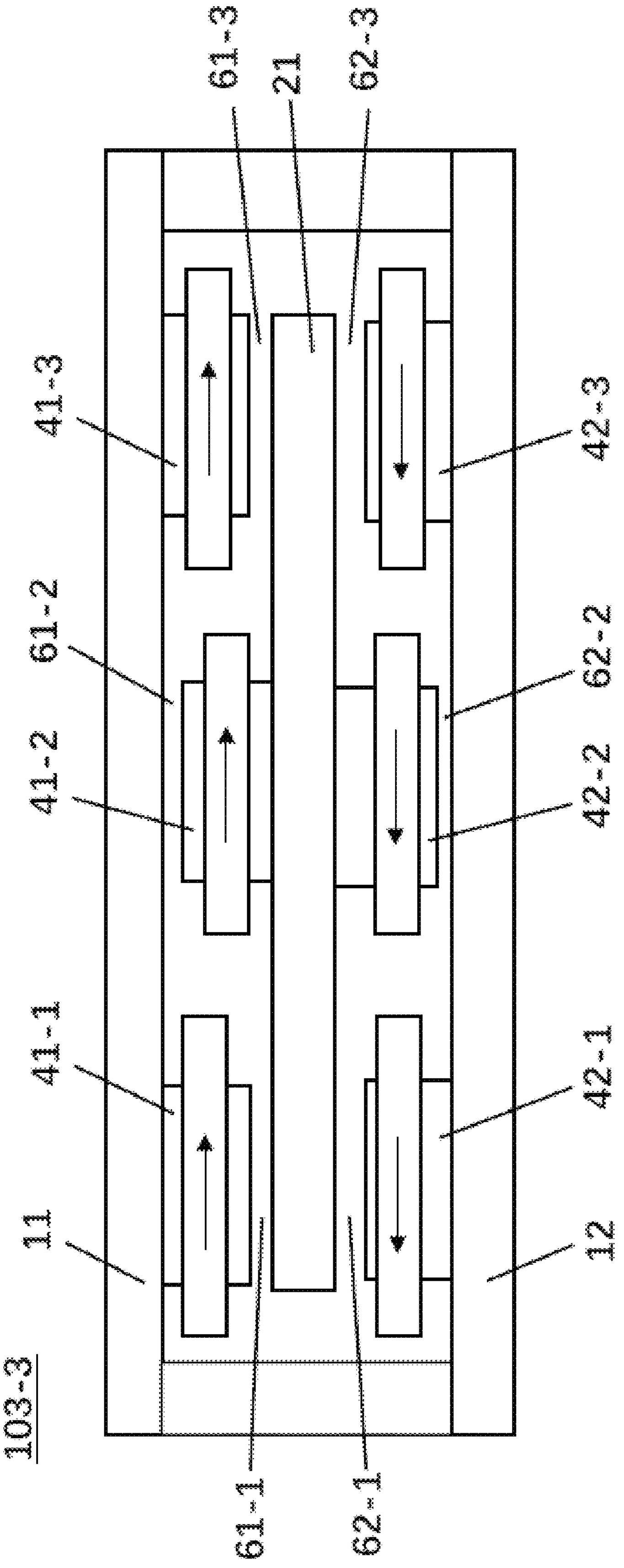
FIG. 3E illustrates a six-phase coupled inductor according to a further variable embodiment on the basis of the structure of FIG. 3A.

As shown in FIG. 3E, which illustrates a structure of a six-phase coupled inductor 103-3 according to a further variable embodiment on the basis of the structure of FIG. 3A, the six-phase coupled inductor 103-3 comprises three first longitudinal middle columns 41-1, 41-2, 41-3 and three second longitudinal middle columns 42-1, 42-2, 42-3. The first air gap 61-1 is disposed between the first longitudinal middle column 41-1 and the second horizontal column 21, the first air gap 61-3 is disposed between the first longitudinal middle column 41-3 and the second horizontal column 21, the first air gap 61-2 is disposed between the first longitudinal middle column 41-2 and the first horizontal column 11 at the upper side, the second air gap 62-1 is disposed between the second longitudinal middle column 42-1 and the second horizontal column 21, the second air gap 62-3 is disposed between the second longitudinal middle column 42-3 and the second horizontal column 21, and the second air gap 62-2 is disposed between the second longitudinal middle column 42-2 and the first horizontal column 12 at the lower side.

Figure 3F:
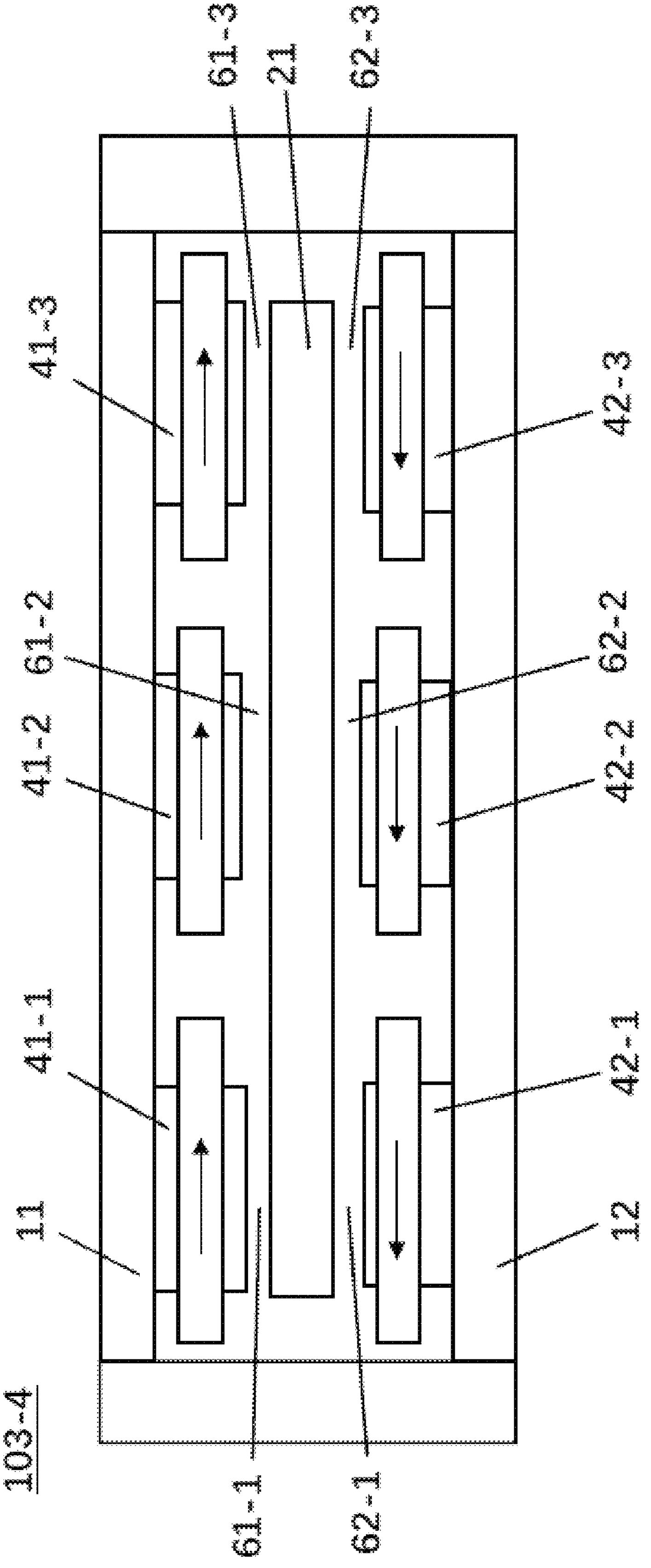
FIG. 3F illustrates a six-phase coupled inductor according to a still further variable embodiment on the basis of the structure of FIG. 3A.

As shown in FIG. 3F, which illustrates a structure of a six-phase coupled inductor 103-4 according to a still further variable embodiment on the basis of the structure of FIG. 3A, the six-phase coupled inductor 103-4 comprises three first longitudinal middle columns 41-1, 41-2, 41-3 and three second longitudinal middle columns 42-1, 42-2, 42-3. The first air gap 61-1 is disposed between the first longitudinal middle columns 41-1 and the second horizontal column 21, the first air gap 61-2 is disposed between the first longitudinal middle column 41-2 and the second horizontal column 21, the first air gap 61-3 is disposed between the first longitudinal middle column 41-3 and the second horizontal column 21, the second air gap 62-1 is disposed between the second longitudinal middle column 42-1 and the second horizontal column 21, the second air gap 62-2 is disposed between the second longitudinal middle column 42-2 and the second horizontal column 21, and the second air gap 62-3 is disposed between the second longitudinal middle columns 42-3 and the second horizontal column 21.

By forming the air gap variously according to the above embodiments, embodiments of the present invention can adjust the inductance parameters such as the inductance amount and the saturation current of the inductor, and also can be suitable for various manufacturing process by selecting the position of the air gap on the basis of the condition of the manufacturing process to improve manufacturability or reduce cost. In addition, any load or any device sensitive to radiation can be avoided by adjusting the position of the air gap, which may reduce EMI or interference.

Figure 4A:
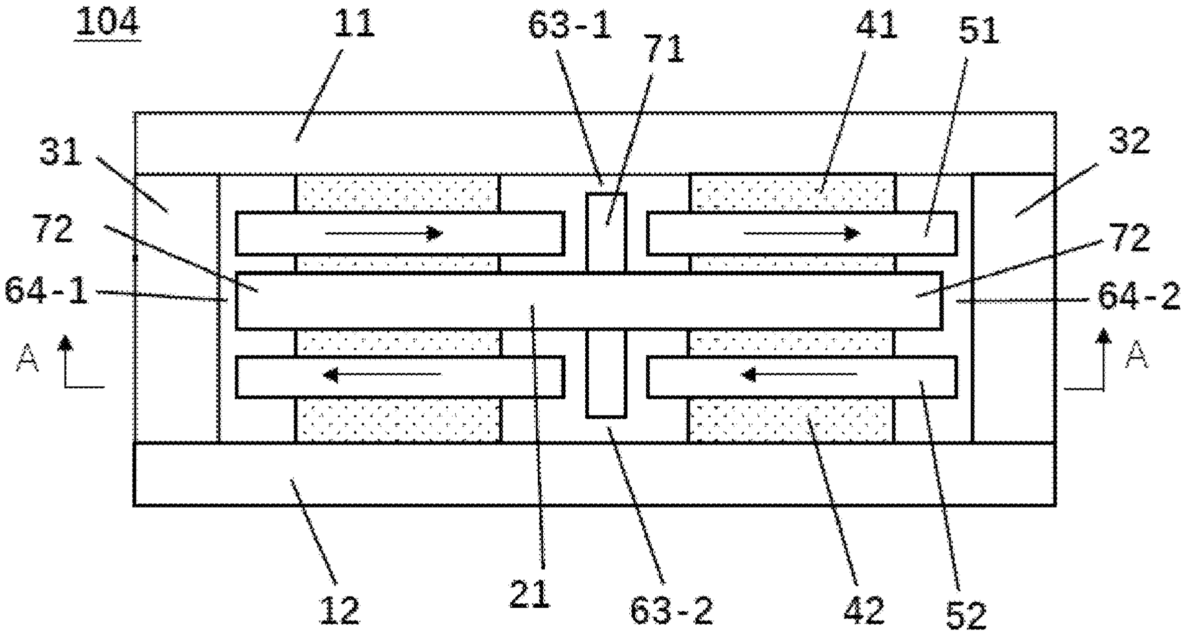
FIG. 4A is a structural diagram of a multi-phase coupled inductor having a decoupling column according to a fourth embodiment of the present invention.
Figure 4B:
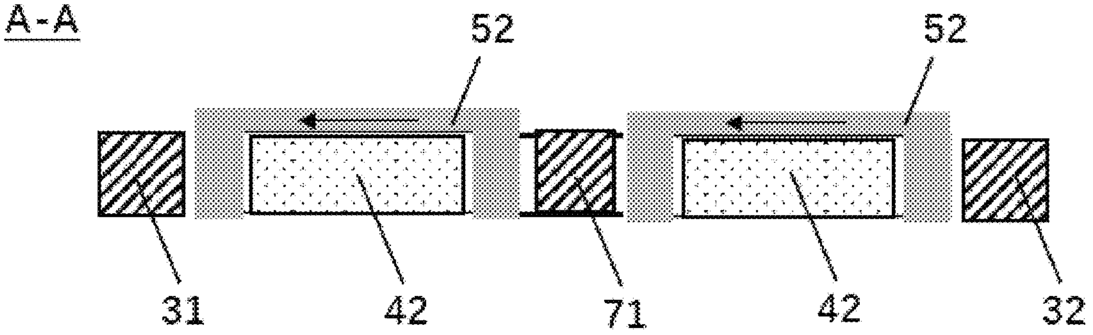
FIG. 4B is a sectional diagram along line A-A in FIG. 4A.

As shown in FIGS. 4A-4B, which illustrate a structure of a multi-phase coupled inductor 104 according to a fourth embodiment of the present invention, a first decoupling column 71 is disposed between the two first horizontal columns 11 and 12 and connected to the second horizontal column 21. Third air gaps 63-1, 63-2 are disposed on a third magnetic path from the second horizontal column 21 to the two first horizontal columns 11, 12 via the first decoupling column 71. A second decoupling column 72 is disposed between the longitudinal side columns 31, 32 and the second horizontal column 21 and connected to the second horizontal column 21. Fourth air gaps 64-1, 64-2 are disposed on a fourth magnetic path from the second horizontal column 21 to the longitudinal side columns 31, 32 via the second decoupling column 72.

Figure 4C:
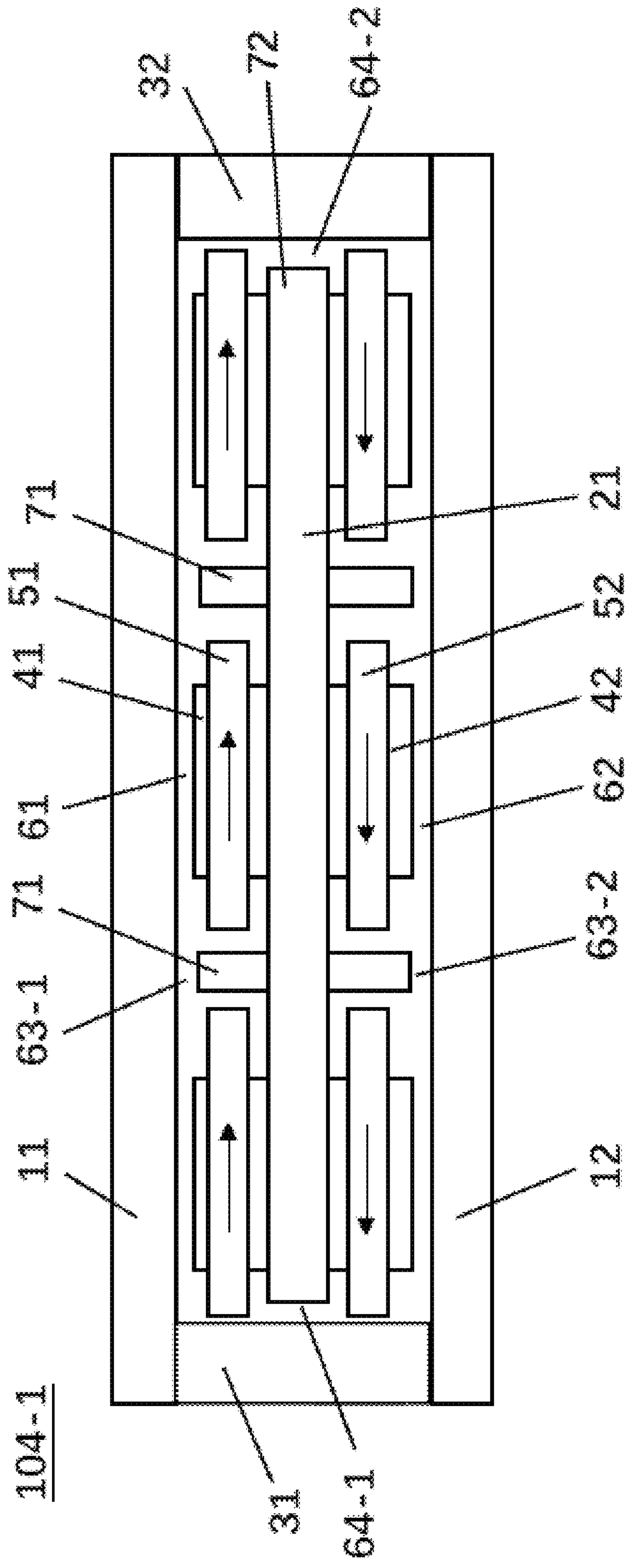
FIG. 4C illustrates a six-phase coupled inductor having an air gap and a decoupling column according to a variable embodiment on the basis of the structure of the multi-phase coupled inductor shown in FIG. 4A.

As shown in FIG. 4C, which illustrates a structure of a six-phase coupled inductor 104-1 according to a variable embodiment on the basis of the structure of FIG. 4A, the six-phase coupled inductor 104-1 comprises three first longitudinal middle columns 41 and three second longitudinal middle columns 42. A first air gap 61 is disposed between the first longitudinal middle columns 41 and the first horizontal column 11 at the upper side, and a second air gap 62 is disposed between the second longitudinal middle columns 42 and the first horizontal column 12 at the lower side. Moreover, a first decoupling column 71 is disposed between the two first horizontal columns 11 and 12 and connected to the second horizontal column 21, a third air gap 63-1 is disposed on a third magnetic path from the second horizontal column 21 to the first horizontal columns 11 via the first decoupling column 71, and a third air gap 63-2 is disposed on a third magnetic path from the second horizontal column 21 to the first horizontal column 12 via the first decoupling column 71. A second decoupling column 72 is disposed between the longitudinal side columns 31, 32 and the second horizontal column 21 and connected to the second horizontal column 21, a fourth air gap 64-1 is disposed on a fourth magnetic path from the second horizontal column 21 to the longitudinal side column 31 via the second decoupling column 72, and a fourth air gap 64-2 is disposed on a fourth magnetic path from the second horizontal column 21 to the longitudinal side column 32 via the second decoupling column 72. In addition, the first decoupling column 71 is disposed between any two adjacent first longitudinal middle columns 41 and between any two adjacent second longitudinal middle columns 42.

Embodiments of the present invention can adjust the coupling strength between phases by disposing the decoupling columns 71 and 72. Further, the magnetic resistance can be reduced by symmetrically disposing a plurality of decoupling columns 71 and 72, thereby improving the efficiency or the capability of supplying saturation current.

As shown in FIGS. 4A-4B, a magnetic material of the first longitudinal middle column 41 and/or the second longitudinal middle column 42 may be different from a magnetic material of other portions of the magnetic core (e.g., at least one of the first horizontal columns 11 and 12, the second horizontal column 21 and the longitudinal side columns 31 and 32). For example, a magnetic permeability of the first longitudinal middle column 41 and the second longitudinal middle column 42 can be smaller than a magnetic permeability of other portions of the magnetic core, i.e., a magnetic permeability of the first longitudinal middle column and the second longitudinal middle column is smaller than a magnetic permeability of at least a portion of other portions of the magnetic core, such that an effect similar as disposing an air gap on the longitudinal middle column as shown in FIGS. 3A-3F can be obtained, and the inductance amount of the inductor of each phase can be adjusted to ensure the inverse coupling between phases. Because the air gap is eliminated, the connection strength between respective portions in the inductor or the production automation can be improved.

Figure 5A:
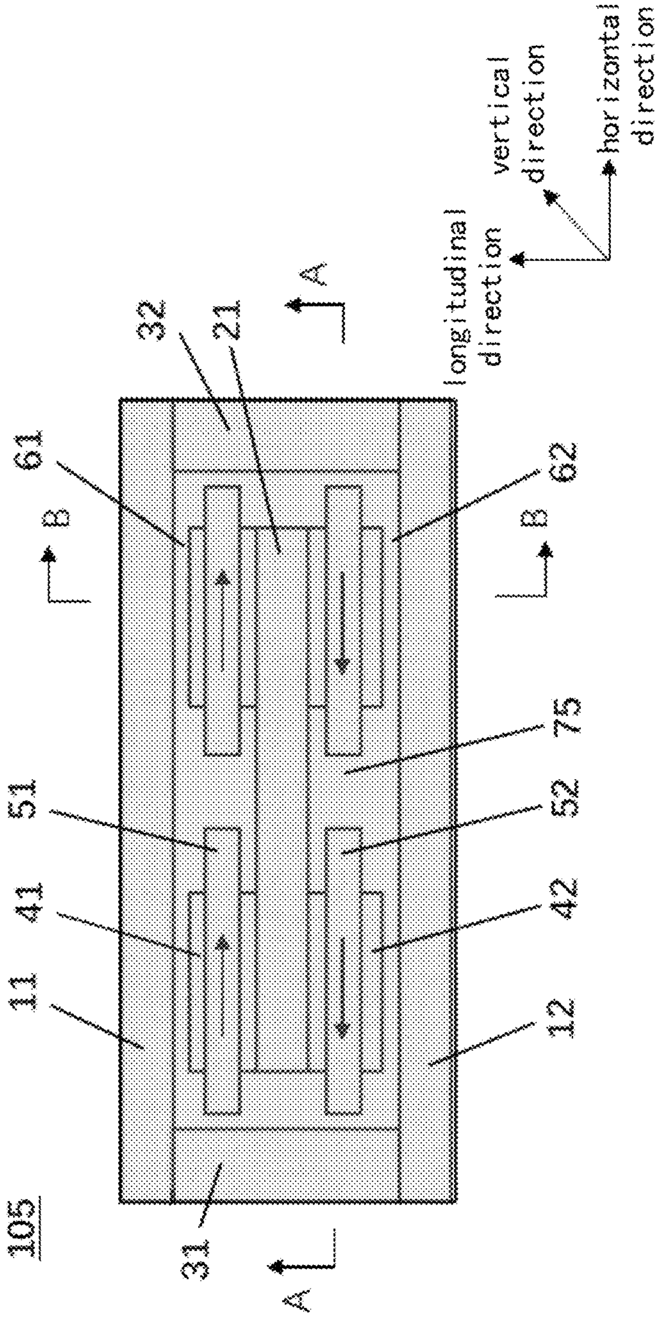
FIG. 5A is a structural diagram of a multi-phase coupled inductor having a stacked decoupling plate according to a fifth embodiment of the present invention.
Figure 5B:
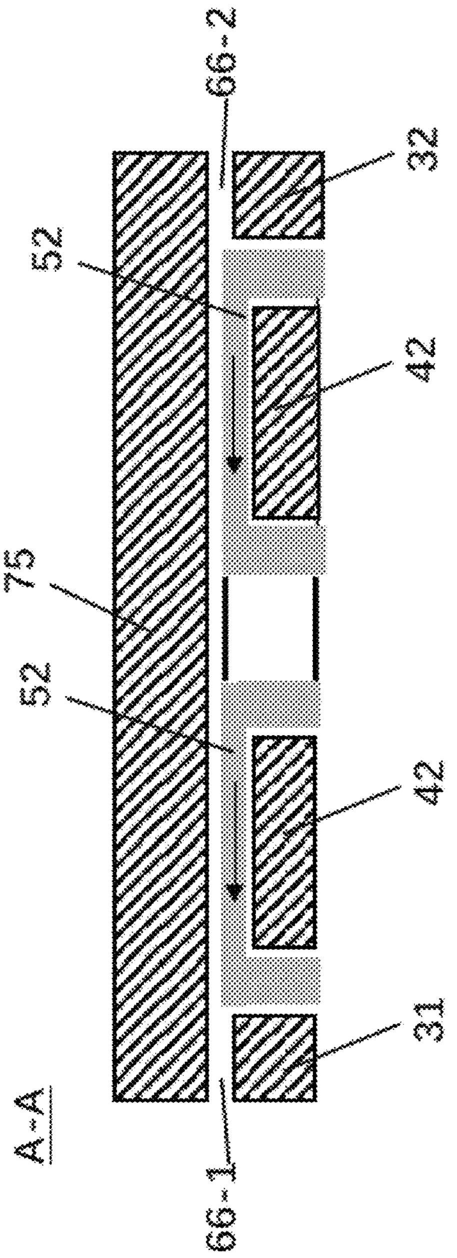
FIG. 5B is a sectional diagram along line A-A in FIG. 5A.
Figure 5C:
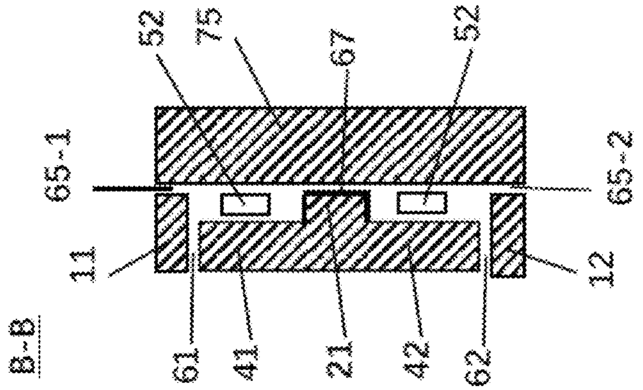
FIG. 5C is a sectional diagram along line B-B in FIG. 5A.

FIGS. 5A-5C illustrate a structure of a multi-phase coupled inductor 105 having a decoupling plate 75 (shown by grey portion in FIG. 5A) according to a fifth embodiment of the present invention. The decoupling plate 75 is stacked with the two first horizontal columns 11 and 12 in a vertical direction which is orthogonal to a horizontal direction and a longitudinal direction. In FIG. 5A, the first horizontal column 11 is extended in the horizontal direction (e.g., left-right direction), the longitudinal side column 31 is extended in the longitudinal direction (e.g., up-down direction) orthogonal to the horizontal direction, and the vertical direction (e.g., front-back direction) is orthogonal to the longitudinal direction and the horizontal direction. In some embodiments, the first air gap 61 may be disposed between the first longitudinal middle columns 41 and the first horizontal column 11 at the upper side, and the second air gap 62 may be disposed between the second longitudinal middle columns 42 and the first horizontal column 12 at the lower side to adjust the inductance amount or saturation current of the inductor. In addition, a fifth air gap 65-1 (as shown in FIG. 5C) may be disposed between the first horizontal columns 11 and the decoupling plate 75, and a fifth air gap 65-2 (as shown in FIG. 5C) may be disposed between the first horizontal columns 12 and the decoupling plate 75; and/or a sixth air gap 66-1 (as shown in FIG. 5B) may be disposed between the longitudinal side column 31 and the decoupling plate 75, and a sixth air gap 66-2 (as shown in FIG. 5B) may be disposed between the longitudinal side column 32 and the decoupling plate 75; and/or a seventh air gap 67 (as shown in FIG. 5C) may be disposed between the second horizontal column 21 and the decoupling plate 75. The decoupling plate 75 can connect the first horizontal column 11 or 12 and the second horizontal column 21 to decouple respective inductors, and the coupling can be adjusted by controlling the air gap between the decoupling plate 75 and the first horizontal column 11 or 12, or the second horizontal column 21, or the longitudinal middle columns. Since the decoupling plate 75 is stacked with other portion of the magnetic core, the decoupling magnetic paths can be disposed between the decoupling plate and the first horizontal column, the second horizontal column, and the longitudinal side columns to shorten the path length and improve the symmetrical arrangement for the decoupling magnetic paths, and the footprint of the inductor may be reduced.

Figure 6:
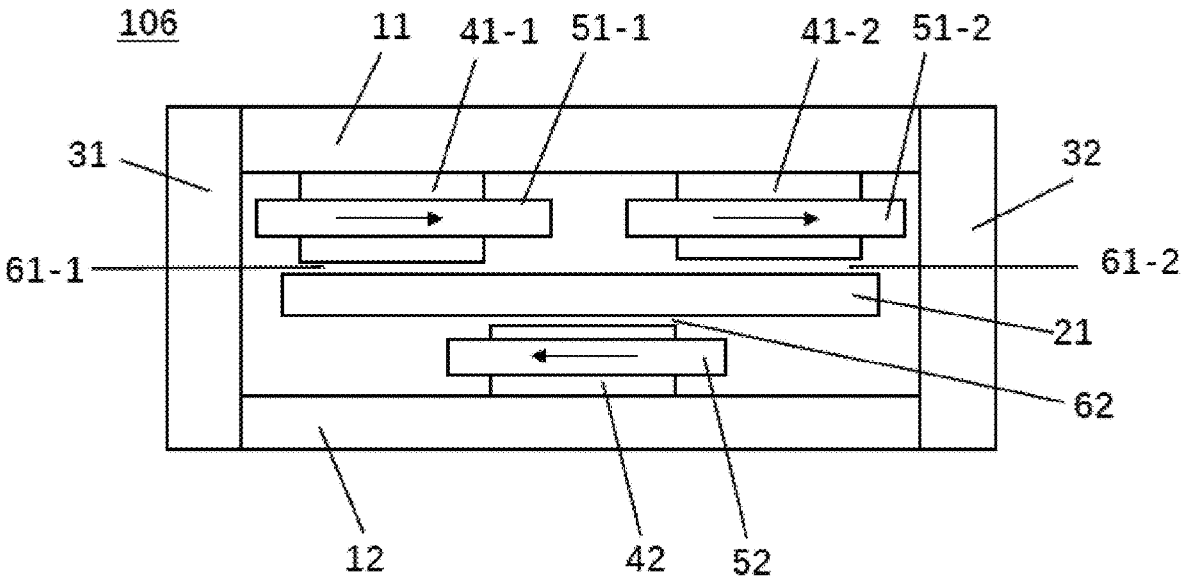
FIG. 6 is a structural diagram of a three-phase coupled inductor having an air gap and a second horizontal column according to a sixth embodiment of the present invention.

FIG. 6 is a structural diagram of a three-phase coupled inductor 106 having an air gap and a second horizontal column according to a sixth embodiment of the present invention. As shown in FIG. 6, the longitudinal middle columns may comprise odd-numbered longitudinal middle columns, such as three longitudinal middle columns, i.e., two first longitudinal middle columns 41-1, 41-2 and one second longitudinal middle column 42 staggered with the two first longitudinal middle columns 41-1, 41-2 along the second horizontal column 21. That is, projections of the first longitudinal middle columns 41-1, 41-2 and the second longitudinal middle column 42 onto the second horizontal column 21 are alternate with each other without overlapping. An inductor consisting of any one of the three longitudinal middle columns and the corresponding winding may form inverse coupled inductors with inductors consisting of other two longitudinal middle columns and the corresponding windings. Further, the first air gap 61-1 can be disposed between the first longitudinal middle columns 41-1 and the second horizontal column 21, the first air gap 61-2 can be disposed between the first longitudinal middle columns 41-2 and the second horizontal column 21, and the second air gap 62 can be disposed between the second longitudinal middle column 42 and the second horizontal column 21 to adjust the inductance amount or saturation current of the inductor. Alternatively, second ends (lower ends) of the first longitudinal middle columns 41-1, 41-2 can be directly connected to the second horizontal column 21, and a second end (upper end) of the second longitudinal middle column 42 can be directly connected to the second horizontal column 21. Any inductor having odd-numbered phases can be applied in this embodiment of the present invention to be suitable for the various requirements of power or current and expand the range of application.

Figure 7A:
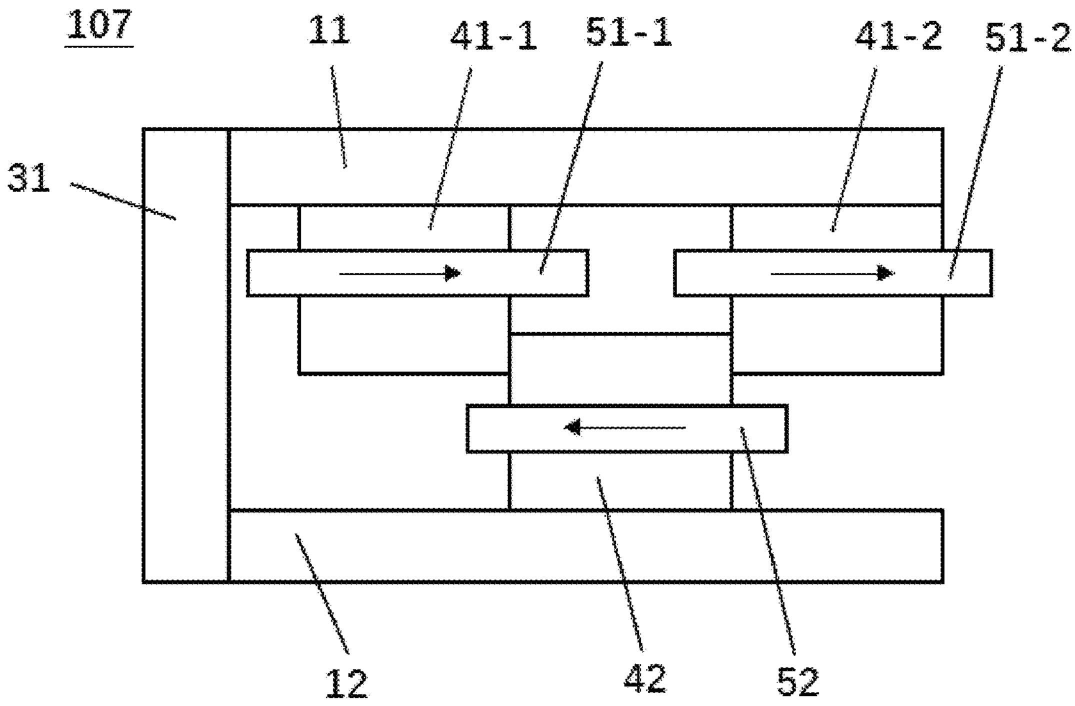
FIG. 7A is a structural diagram of a three-phase coupled inductor, in which a second horizontal column is not included and a first longitudinal middle column is directly connected to a second longitudinal middle column through their side surfaces according to a seventh embodiment of the present invention.

FIG. 7A is a structural diagram of a three-phase coupled inductor 107 having only one longitudinal side column 31 without second horizontal column according to a seventh embodiment of the present invention. The connection between the second ends (lower ends) of the two first longitudinal middle columns 41-1, 41-2 and the second end (upper end) of the second longitudinal middle column 42 is obtained by direct contact of the side surfaces. That is, as shown in FIG. 7A, a portion of the second longitudinal middle column 42 is interposed between the two first longitudinal middle columns 41-1 and 41-2, and the communication of the magnetic paths is obtained by the mutual contact between the side surfaces of the longitudinal middle columns.

Figure 7B:
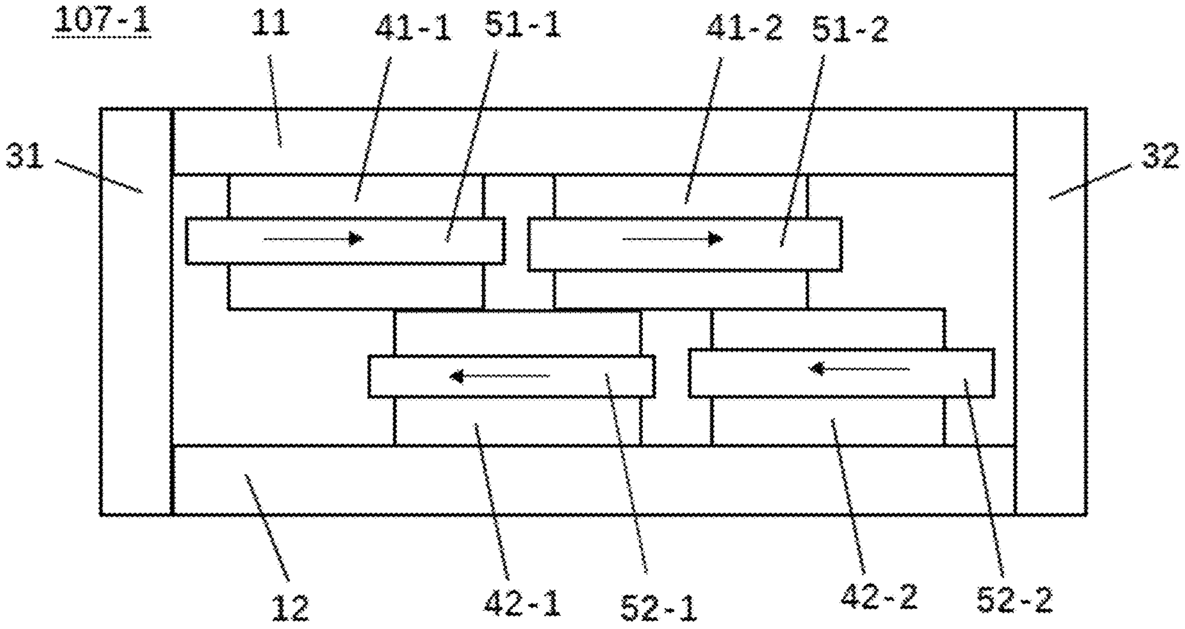
FIG. 7B is a structural diagram of a multi-phase coupled inductor in which a first longitudinal middle column and a second longitudinal middle column are staggered, partially overlapped and directly connected with each other through the overlapped end surfaces according to a variable embodiment on the basis of the structure of FIG. 7A.

FIG. 7B is a structural diagram of a multi-phase coupled inductor 107-1 according to a variable embodiment of on the basis of the structure of FIG. 7A. The magnetic core comprises two longitudinal side columns 31, 32, two first longitudinal middle columns 41-1, 41-2 and two second longitudinal middle columns 42-1, 42-2. The two first longitudinal middle columns 41-1, 41-2 and the two second longitudinal middle columns 42-1, 42-2 are staggered in the horizontal direction, partially overlapped with other, and directly connected with each through the overlapped end surfaces. That is, a right-sided portion of the lower end surface of the first longitudinal middle column 41-1 is in contact with a left-sided portion of the upper end surface of the second longitudinal middle column 42-1, a left-sided portion of the lower end surface of the first longitudinal middle column 41-2 is in contact with a right-sided portion of the upper end surface of the second longitudinal middle column 42-1, and a right-sided portion of the lower end surface of the first longitudinal middle column 41-2 is in contact with a left-sided portion of the upper end surface of the second longitudinal middle column 42-2, thereby obtaining mutual communication between the magnetic paths.

In the embodiments shown in FIGS. 7A and 7B, the number of phases of the multi-phase coupled inductor of the embodiments can be either even-numbered or odd-numbered. Moreover, the mutual connection between the second end of the first longitudinal middle column and the second end of the second longitudinal middle column can be obtained by direct contact of the longitudinal middle columns without requiring the second horizontal column, which can further simplify the structure, simplify the manufacturing or assembling process, and reduce the volume and cost.

Referring to FIGS. 6, 7A and 7B, the first longitudinal middle column and the second longitudinal middle column can be staggered in the horizontal direction. For example, as shown in FIG. 6, the first longitudinal middle column 41-1, the second longitudinal middle column 42 and the first longitudinal middle column 41-2 can be staggered along the second horizontal column 21 in the horizontal direction. That is, the projections of the first longitudinal middle column 41-1, the second longitudinal middle column 42 and the first longitudinal middle column 41-2 onto the second horizontal column 21 are staggered with each other. In addition, in the embodiments of FIGS. 1 to 5, the first longitudinal middle column and the second longitudinal middle column can be aligned with each other with respect to the second horizontal column 21 in the longitudinal direction. That is, the projections of the first longitudinal middle column and the second longitudinal middle column onto the second horizontal column 21 are aligned or overlapped with each other.

Figure 8A:
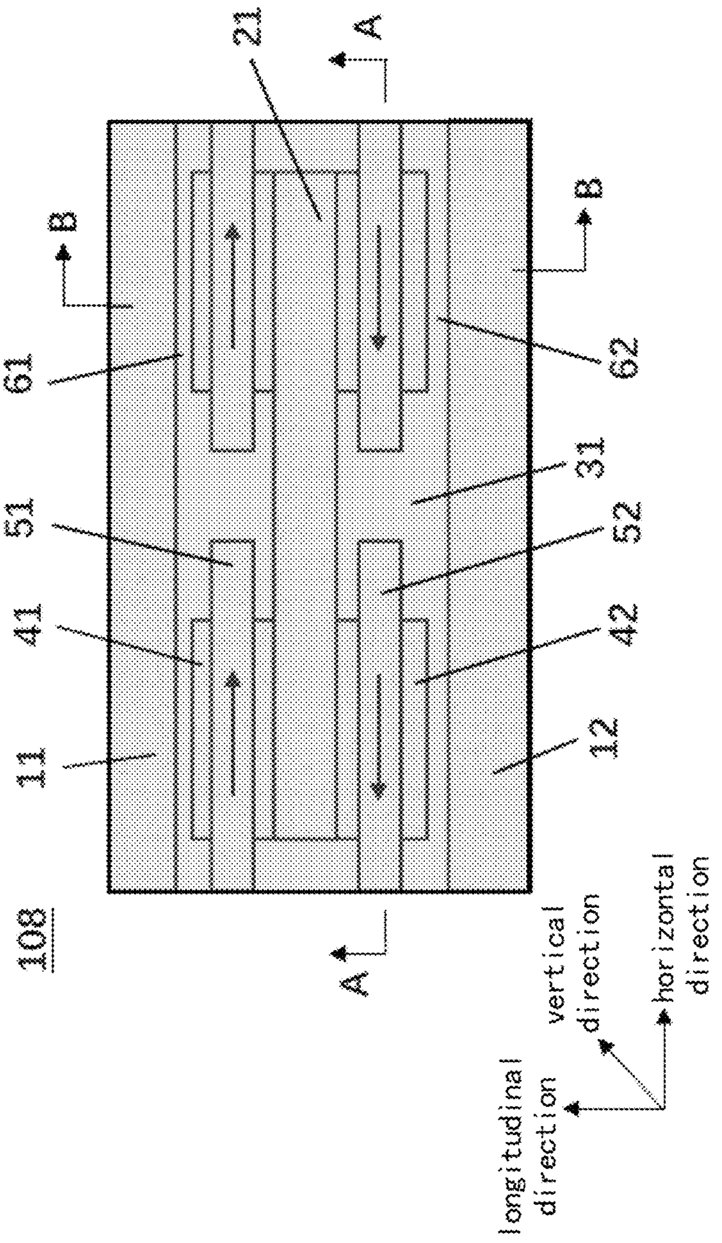
FIG. 8A is a structural diagram of a multi-phase coupled inductor in which a longitudinal side column is stacked with a longitudinal middle column according to an eighth embodiment of the present invention.
Figure 8B:
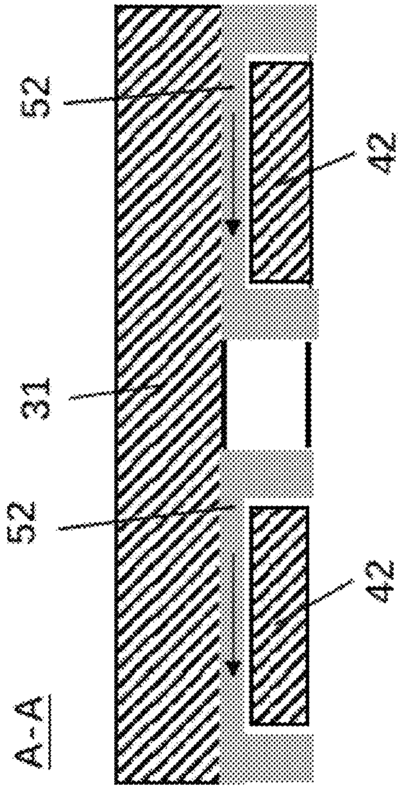
FIG. 8B is a sectional diagram along line A-A in FIG. 8A.
Figure 8C:
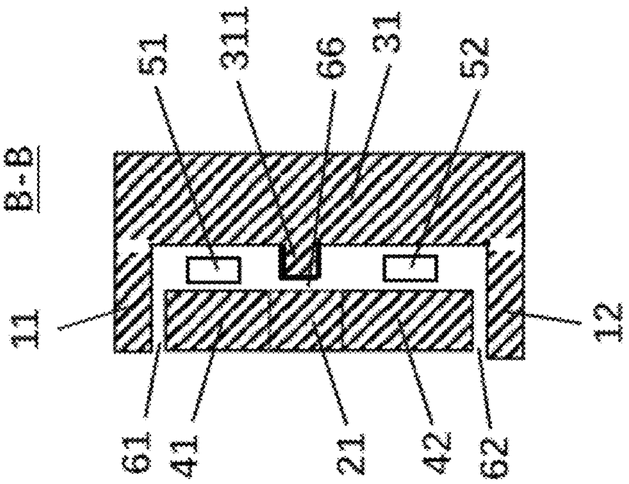
FIG. 8C is a sectional diagram along line B-B in FIG. 8A.

FIGS. 8A-8C are structural diagrams of a multi-phase coupled inductor 108 having one longitudinal side column 31 of plate shape (shown by grey portion) according to an eighth embodiment of the present invention. The longitudinal side column 31 is stacked with the longitudinal middle columns 41 and 42 in a vertical direction. That is, the longitudinal side column 31 is extended in a length direction of the two first horizontal columns 11 and 12 to have a plate shape between the two first horizontal columns 11 and 12, and is stacked with the longitudinal middle columns 41 and 42 in the vertical direction. This embodiment differs from the previous embodiments in that the longitudinal side column 31 is stacked with the first longitudinal middle column 41 and the second longitudinal middle column 42, such that the relative positions of the longitudinal side column 31 with respect to the first longitudinal middle column 41 and the second longitudinal middle column 42 can be uniform and symmetrical, which improves the uniformity of the lengths of the inverse coupled magnetic paths between phases, and improves the uniformity of the inductance amount and coupling coefficient of respective phases. As shown in FIG. 8C, an air gap 66 can be disposed between the second horizontal column 21 and the longitudinal side column 31, e.g., through a protruding portion 311, to adjust the coupling coefficient. In addition, since the longitudinal side column 31 is stacked, the footprint of the inductor can be reduced, thereby facilitating the adjustment of the structure.

Figure 8D:
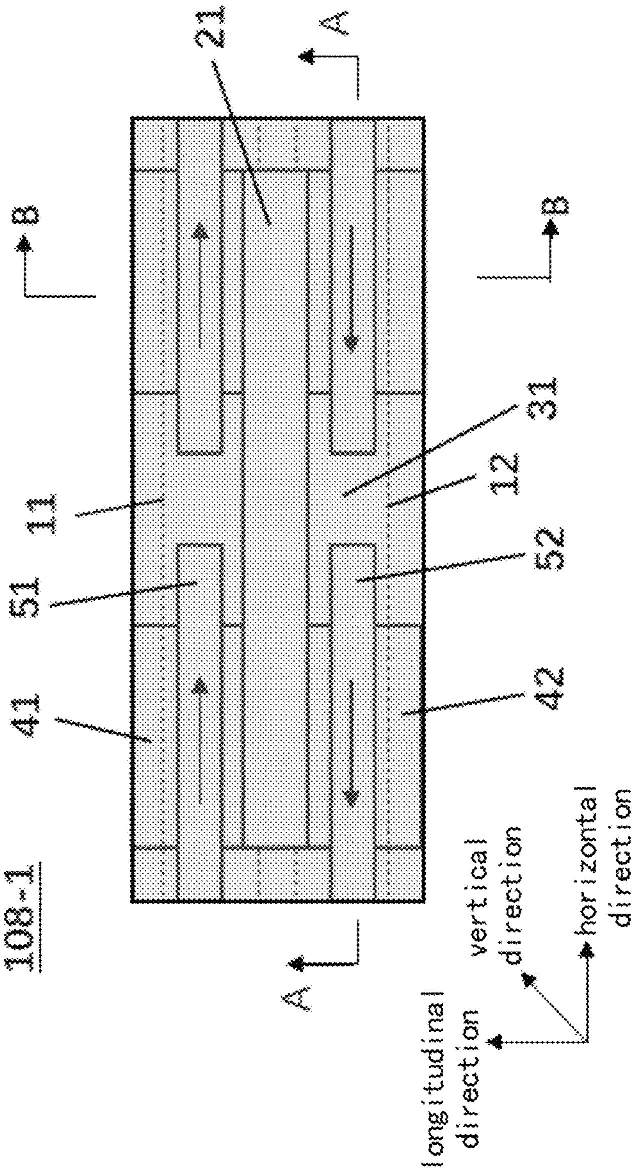
FIG. 8D is a structural diagram of a multi-phase coupled inductor in which a second horizontal column is stacked with a longitudinal side column and a longitudinal middle column according to a variable embodiment on the basis of the structure of FIG. 8A.
Figure 8F:
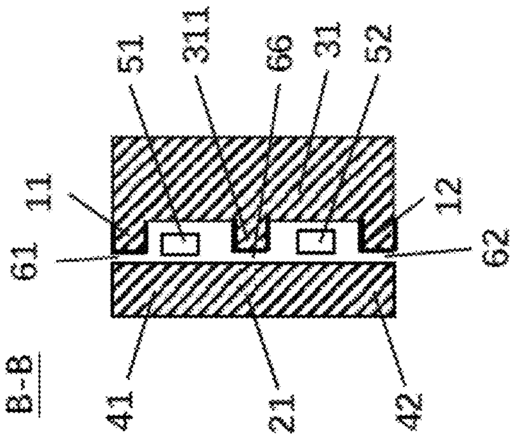
FIG. 8F is a sectional diagram along line B-B in FIG. 8D.
Figure 8E:
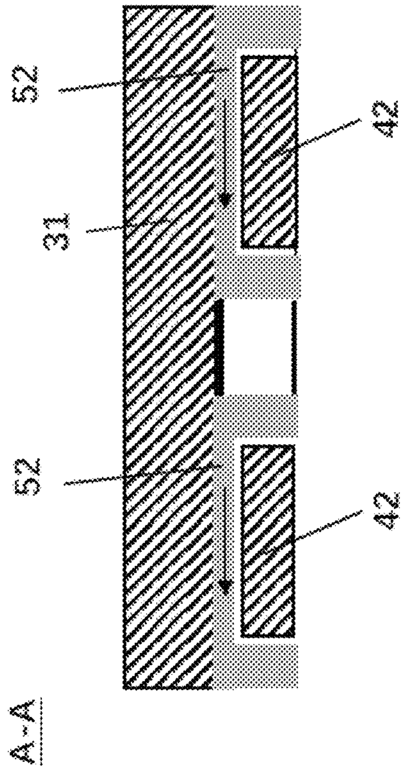
FIG. 8E is a sectional diagram along line A-A in FIG. 8D.

FIGS. 8D-8F are structural diagrams of a multi-phase coupled inductor 108-1 in which the two first horizontal columns 11, 12 and the plate-shaped longitudinal side column 31 (shown by grey portion) are stacked with two the longitudinal middle column (the first longitudinal middle column 41 and the second longitudinal middle column 42) according to a variable embodiment on the basis of the structure of FIG. 8A. As shown in FIG. 8F, the first horizontal columns 11 and 12 are located at upper and lower sides of the longitudinal side column 31 and connected to the plate-shaped longitudinal side column 31. Alternatively, an air gap can be provided. That is, the first horizontal columns 11 and 12 can be connected to the plate-shaped longitudinal side column 31 through the air gap. In addition, an air gap 66 can be disposed between the longitudinal side column 31 and the second horizontal column 21, a first air gap 61 can be disposed between the first horizontal column 11 and the first longitudinal middle column 41, and a second air gap 62 can be disposed between the first horizontal column 12 and the second longitudinal middle column 42 to adjust the inverse coupling between phases. The embodiment shown in FIGS. 8D-8F can simplify of the structure, facilitate the manufacturing and reduce the cost.

In the embodiments, when the plate-shaped longitudinal side column is stacked, a decoupling plate can also be provided. For example, the longitudinal side column can be stacked above the decoupling plate. Alternatively, the longitudinal middle column can serve as the decoupling plate, but the present invention is not limited thereto.

Based on the embodiment shown in FIG. 8A, embodiments of the present invention can provide a two-phase coupled inductor comprising a magnetic core and a plurality of windings. The magnetic core comprises two first horizontal columns, one longitudinal side column and a plurality of longitudinal middle columns. The plurality of longitudinal middle columns comprise one first longitudinal middle column and one second longitudinal middle column. The longitudinal side column is connected to the two first horizontal columns, a first end of the first longitudinal middle column is connected to one of the two first horizontal columns, a first end of the second longitudinal middle column is connected to other one of the two first horizontal columns, and a second end of the first longitudinal middle column is connected to a second end of the second longitudinal middle column. The plurality of windings comprise a first winding and a second winding. The first winding is wound around the first longitudinal middle column and the second winding is wound around the second longitudinal middle column; or the first winding is wound around the first longitudinal middle column and then wound around the longitudinal side column by crossing of the first winding, and the second winding is wound around the second longitudinal middle column and then wound around the longitudinal side column by crossing of the second winding. A magnetic flux direction of a DC magnetic flux generated by a current flowing through any one of the windings is opposite to a magnetic flux direction of a DC magnetic flux generated by a current flowing through other one of the windings, on the longitudinal middle column corresponding to the other one of the windings. Moreover, the longitudinal side column may have a plate shape, and may be stacked with the two first horizontal columns in a vertical direction.

Figure 9A:
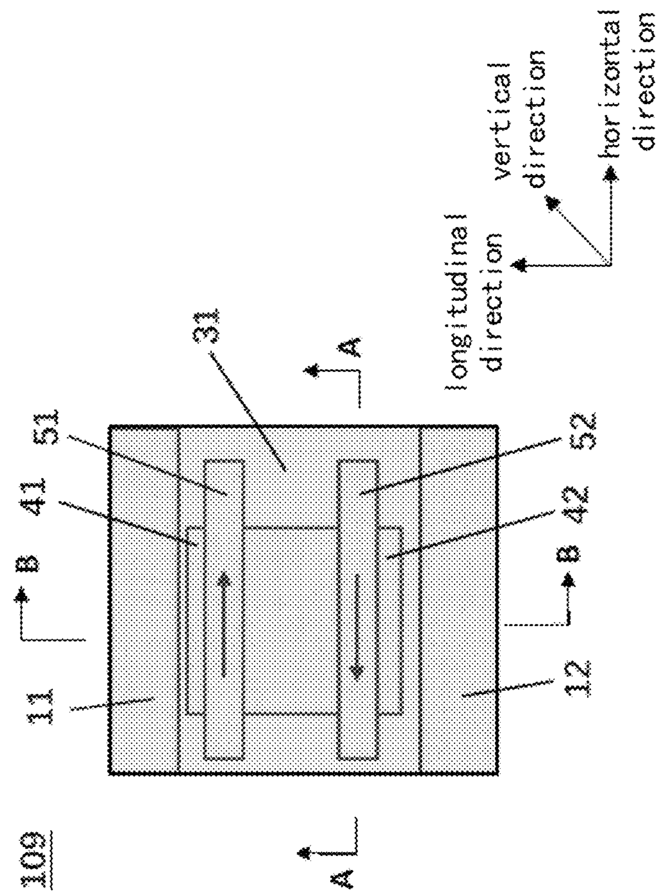
FIG. 9A is a top view of a two-phase coupled inductor in which a longitudinal side column and a longitudinal middle column are stacked according to a ninth embodiment of the present invention, on the basis of the embodiment shown in FIG. 8A.

FIG. 9A is a top view of a two-phase coupled inductor 109 in which a longitudinal side column and a longitudinal middle column are stacked according to a ninth embodiment of the present invention, on the basis of the embodiment shown in FIG. 8A. The two-phase coupled inductor 109 comprises a magnetic core and two windings. The magnetic core comprises two first horizontal columns 11 and 12 opposite to each other, one plate-shaped longitudinal side column 31 (shown by grey portion), one first longitudinal middle column 41 and one second longitudinal middle column 42. A first end of the first longitudinal middle column 41 is connected to the first horizontal column 11, a first end of the second longitudinal middle column 42 is connected to the first horizontal column 12, and a second end of the first longitudinal middle column 41 is connected to a second end of the second longitudinal middle column 42. The two windings comprise a first winding 51 wound around the first longitudinal middle column 41 and a second winding 52 wound around the second longitudinal middle column 42. Current flows through the first winding 51 and the second winding 52 to form a magnetic flux. For example, a direction of a current flowing through the first winding 51 is the right direction, and a DC magnetic flux generated by the current flowing through the first winding 51 has an upward magnetic flux direction (e.g., referred to as first direction) on the first longitudinal middle column 41. A direction of a current flowing through the second winding 52 is the left direction, and a DC magnetic flux generated by the current flowing through the second winding 52 has a downward magnetic flux direction (e.g., referred to as second direction) on the second longitudinal middle column 42. The first direction is opposite to the second direction. Moreover, a DC magnetic flux generated by the current flowing through the first winding 51 has the upward magnetic flux direction on the second longitudinal middle column 42, which is opposite to the downward magnetic flux direction, on the corresponding second longitudinal middle column 42, of the DC magnetic flux generated by the current flowing through the second winding 52. In addition, the longitudinal side column 31 has a plate shape, and is stacked with the two first horizontal columns 11 and 12 in a vertical direction. That is, the plate-shaped longitudinal side column 31 located at upper side or lower side of the two first horizontal columns 11 and 12 is stacked with the two first horizontal columns 11 and 12.

Figure 9C:
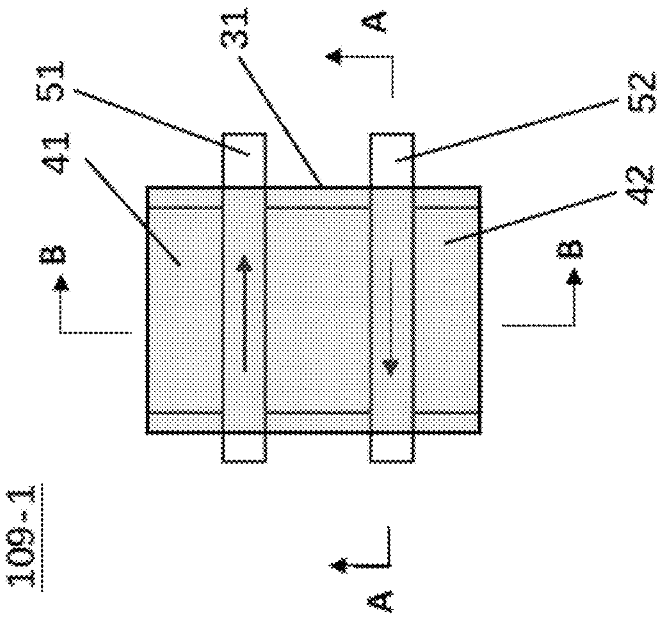
FIG. 9C is a top view of a two-phase coupled inductor according to another embodiment on the basis of the embodiment shown in FIG. 8D.
Figure 9B:
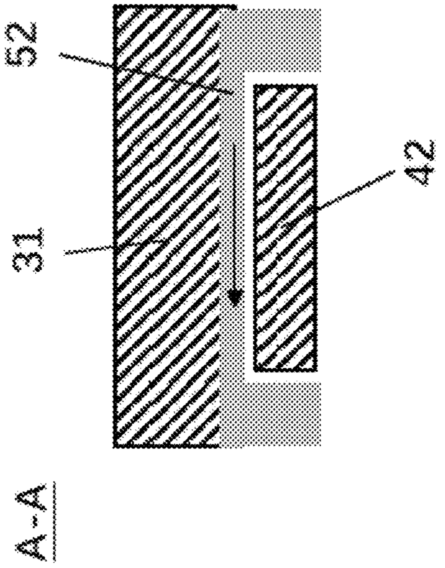
FIG. 9B is a sectional diagram along line A-A in FIG. 9A.

A sectional view along line B-B of FIG. 9A is shown in FIG. 8C. FIG. 9C is a top view of a two-phase coupled inductor according to another embodiment on the basis of the embodiment shown in FIG. 8D. A sectional view along line A-A of FIG. 9C is shown in FIG. 9B, and a sectional view along line B-B of FIG. 9C is shown in FIG. 8F.

Figure 10A:
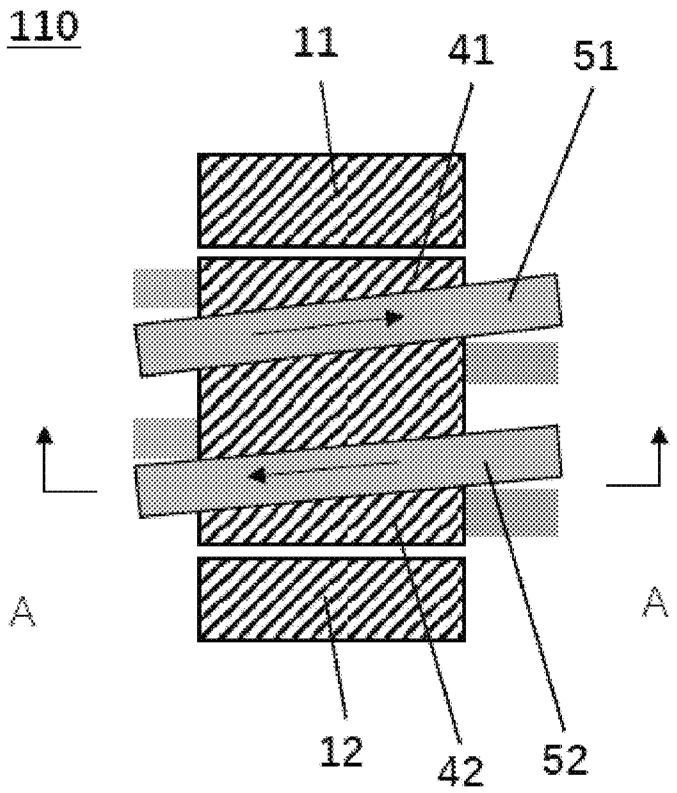
FIG. 10A is a structural diagram of a two-phase coupled inductor in which a longitudinal side column and a longitudinal middle column are stacked and a winding is exposed from a magnetic core according to a tenth embodiment of the present invention.

FIG. 10A is a structural diagram of a two-phase coupled inductor 110 according to a tenth embodiment of the present invention, in which a longitudinal side column (not shown) is stacked with a first longitudinal middle column 41 and a second longitudinal middle column 42, and a first winding 51 and a second winding 52 are exposed from a magnetic core to facilitate the heat dissipation.

Figure 10B:
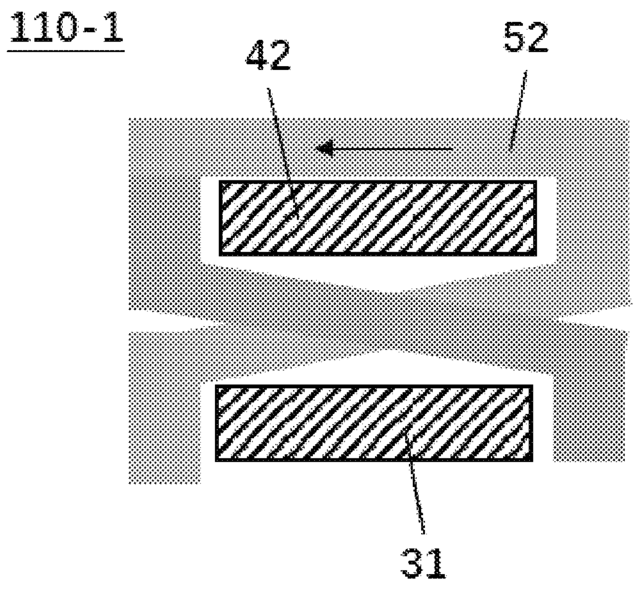
FIG. 10B is a structural diagram of a two-phase coupled inductor in which a winding is wound around a longitudinal middle column and a longitudinal side column according to a variable embodiment of the present invention.

FIG. 10B is a structural diagram of a two-phase coupled inductor 110-1 according to a variable embodiment of the present invention, in which the first winding 51 is wound around the first longitudinal middle column (not shown) and then wound around the longitudinal side column 31 by crossing of the first winding 51, and the second winding 52 is wound around the second longitudinal middle column 42 and wound around the longitudinal side column 31 by crossing of the second winding 52. Such structure may be beneficial to the magnetic path, may increase the inductance amount for the inductor having the same volume, and improve the heat dissipation by exposing the windings.

Figure 11A:
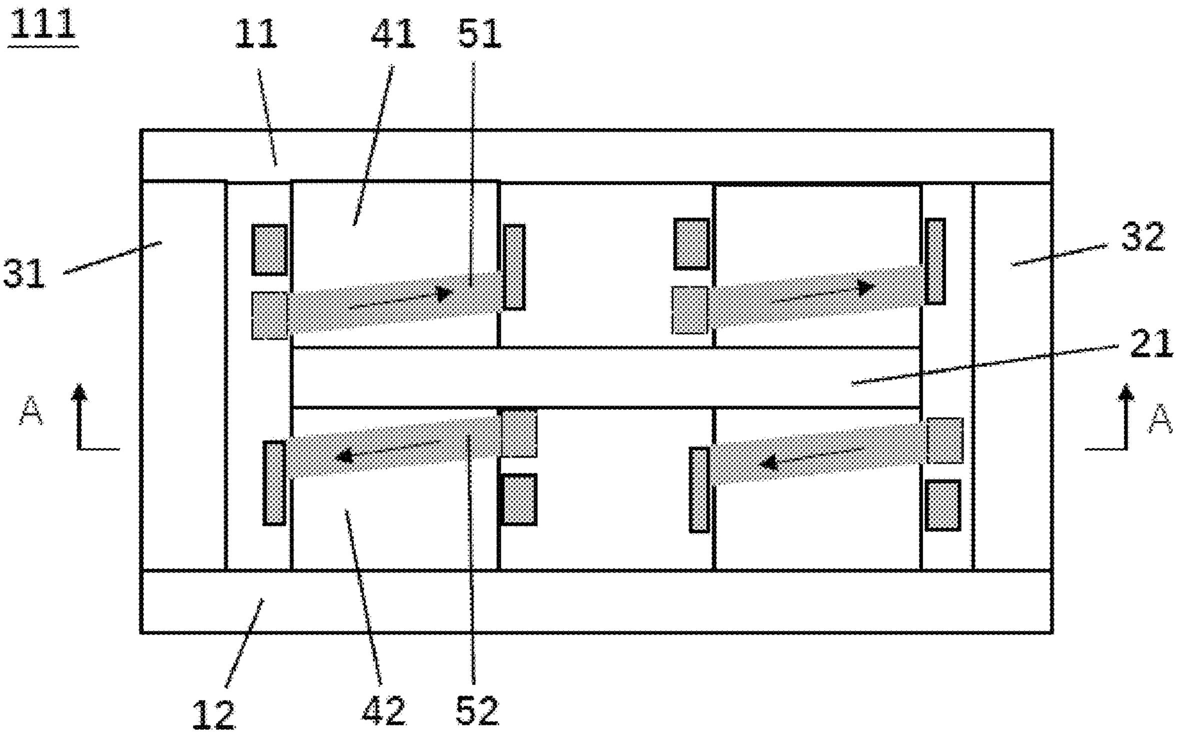
FIG. 11A is a structural diagram of a multi-phase coupled inductor having multiple turns or bi-directionally extended terminals according to an eleventh embodiment of the present invention.
Figure 11B:
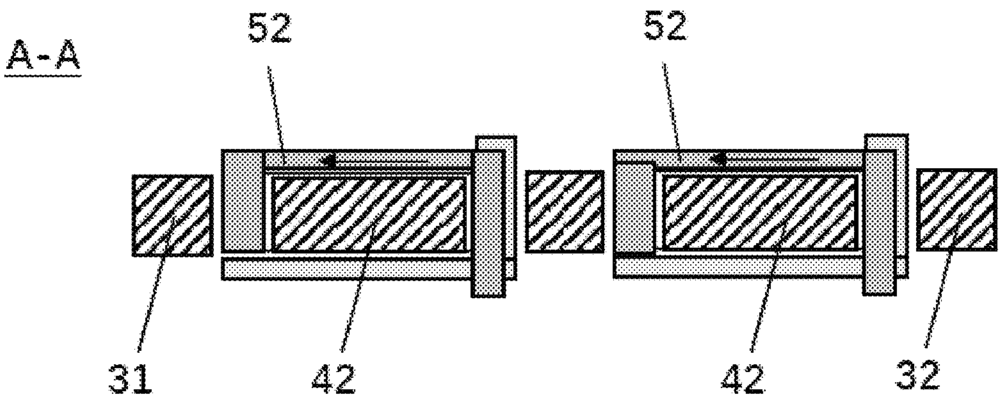
FIG. 11B is a sectional diagram along line A-A in FIG. 11A.

FIGS. 11A-11B are structural diagrams of a multi-phase coupled inductor 111 having multiple turns or bi-directionally extended terminals according to an eleventh embodiment of the present invention. The first winding 51 and the second winding 52 can have multiple turns, and terminals on both ends of the same winding can be located on an upper surface and a lower surface of the magnetic core in the vertical direction, respectively, such that an inductor having fractional turns can be formed. For example, the second winding 52 shown in FIG. 11B has 1.5 turns. Alternatively, it may has 2.5, 3.5 or other fractional turns. In such a way, the number of turns and the inductance amount of the inductor can be adjusted. In addition, extending the terminals of the first winding 51 and the second winding 52 to the upper and lower surfaces may facilitate the application of the stacked module structure, and also facilitate the transmission of heat in the vertical direction.

Figure 12A:
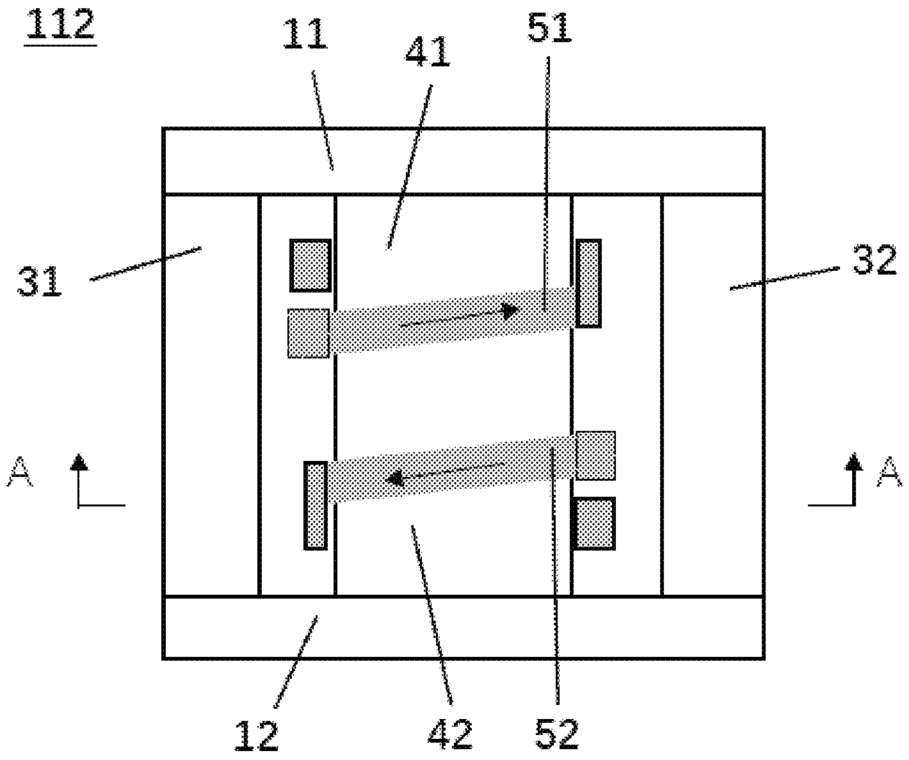
FIG. 12A is a structural diagram of a two-phase coupled inductor having multiple turns or bi-directionally extended terminals according to a twelfth embodiment of the present invention.
Figure 12B:
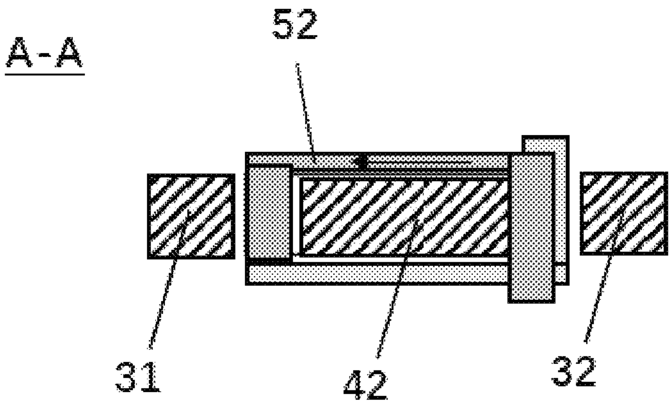
FIG. 12B is a sectional diagram along line A-A in FIG. 12A.

FIGS. 12A-12B are structural diagrams of a two-phase coupled inductor 112 having multiple turns or bi-directionally extended terminals according to a twelfth embodiment of the present invention. The first winding 51 and the second winding 52 can have multiple turns, and terminals on both ends of the same winding can be located on an upper surface and a lower surface of the magnetic core in the vertical direction, respectively, such that an inductor having fractional turns can be formed. For example, the second winding 52 shown in FIG. 12B has 1.5 turns. Alternatively, it may has 2.5, 3.5 or other fractional turns. In such a way, the number of turns and the inductance amount of the inductor can be adjusted. In addition, extending the terminals of the first winding 51 and the second winding 52 to the upper and lower surfaces may facilitate the application of the stacked module structure, and also facilitate the transmission of heat in the vertical direction.

Figure 13A:
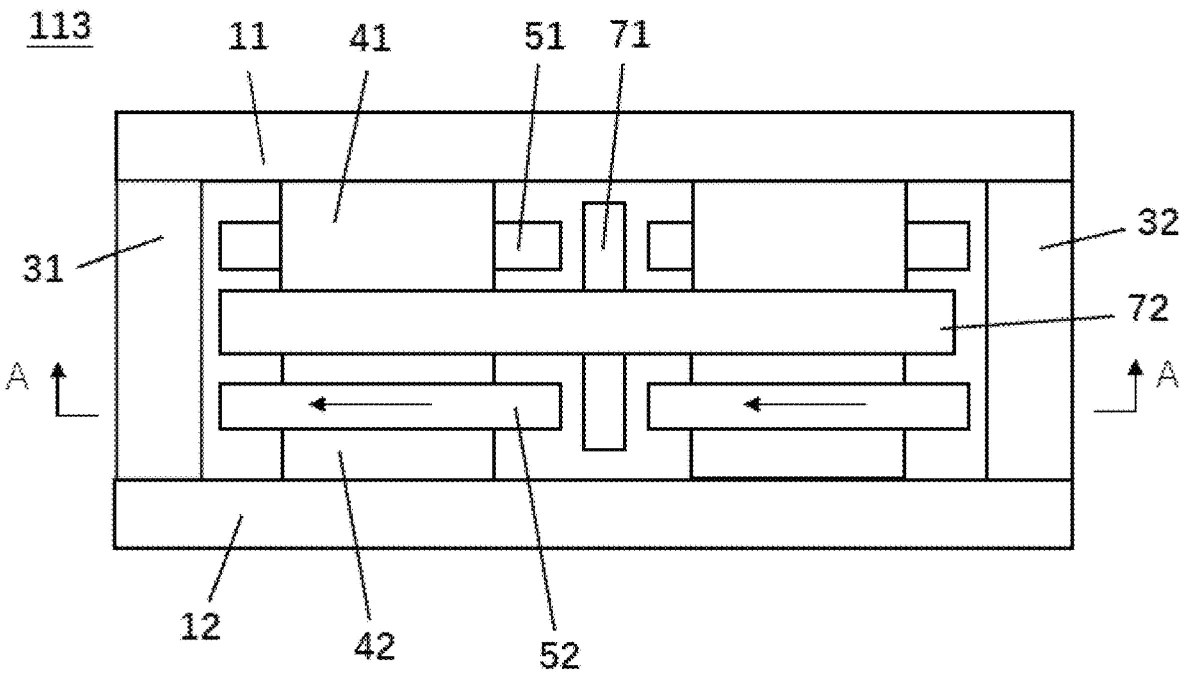
FIG. 13A is a structural diagram of a multi-phase coupled inductor having another type of bi-directionally extended terminals according to a thirteenth embodiment of the present invention.
Figure 13B:
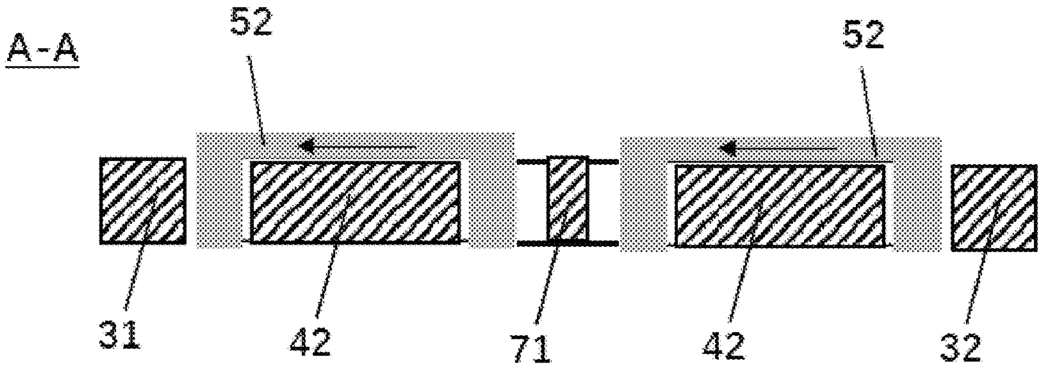
FIG. 13B is a sectional diagram along line A-A in FIG. 13A.

FIGS. 13A-13B are structural diagrams of a multi-phase coupled inductor 113 having another type of bi-directionally extended terminals according to a thirteenth embodiment of the present invention. Two terminals of the first winding 51 on the first longitudinal middle column 41 are extended to the upper surface in the vertical direction, and two terminals of the second winding 52 on the second longitudinal middle column 42 are extended to the lower surface in the vertical direction (as shown in FIG. 13B), such that an inductor having a structure where terminals are extended to the upper and lower surfaces of the inductor can be formed. For example, in some of the power supply modules, chips can be disposed on both sides of the inductor and output terminals of the inductor can be located on both sides of the inductor, such that an application range of the present invention can be expanded and the flexibility of application can be improved.

Figure 14A:
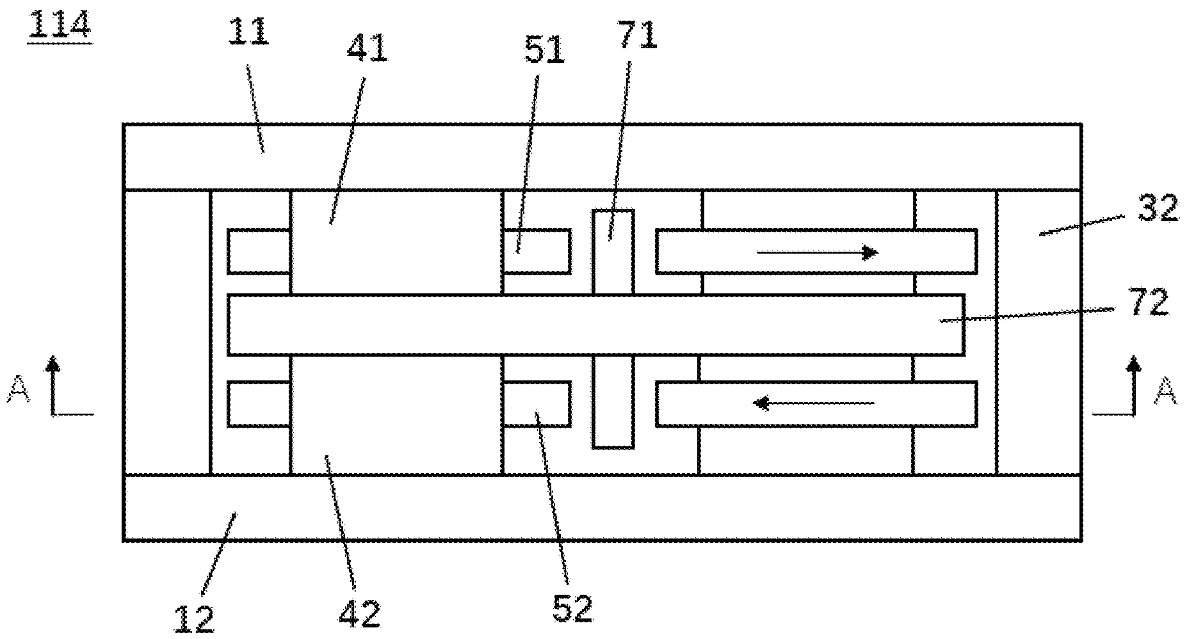
FIG. 14A is a structural diagram of a multi-phase coupled inductor having still another type of bi-directionally extended terminals according to a fourteenth embodiment of the present invention.
Figure 14B:
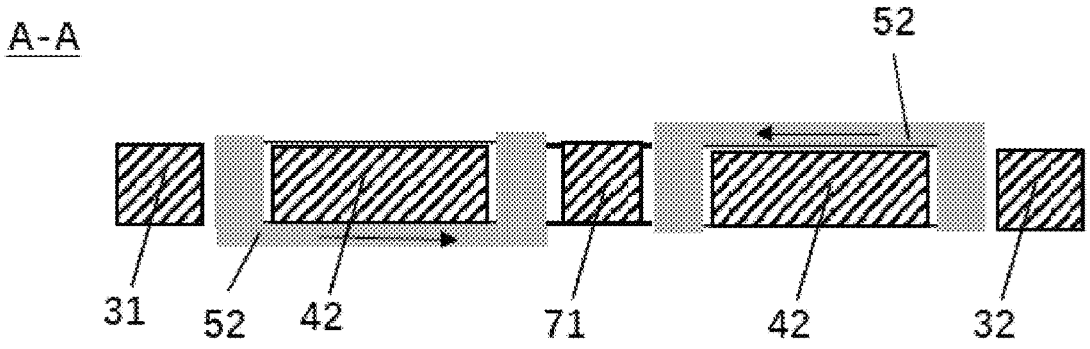
FIG. 14B is a sectional diagram along line A-A in FIG. 14A.

FIGS. 14A-14B are structural diagrams of a multi-phase coupled inductor 114 having still another type of bi-directionally extended terminals according to a fourteenth embodiment of the present invention, which is different from the embodiment of FIGS. 13A-13B in that, as shown in FIG. 14A, terminals of the first winding 51 and the second winding 52 at the left side are extended to the same side (upper surface in the vertical direction) of the magnetic core, and terminals of the first winding 51 and the second winding 52 at the right side are extended to the other side (lower surface in the vertical direction) of the magnetic core. In another embodiment, other variations may be provided that among the plurality of windings, at least one terminal of the windings is extended to the upper surface of the magnetic core in the vertical direction, and at least one terminal of the windings is extended to the lower surface of the magnetic core in the vertical direction. In some of the power supply modules, chips can be disposed on both sides of the inductor and output terminals of the inductor can be located on both sides of the inductor, such that an application range of the present invention can be expanded and the flexibility of application can be improved.

Embodiments of the present invention further provides a multi-phase coupled inductor array, comprising a magnetic core and a plurality of windings. The magnetic core comprises: N first horizontal columns; M second horizontal columns parallel to and staggered with the N first horizontal columns, wherein $M \leq N \leq (M+1)$, $M \geq 2$, and N and M are both positive integers; at least one longitudinal side column connected to first ends of the N first horizontal columns; a first connection magnetic column connected to first ends of the M second horizontal columns; and a plurality of longitudinal middle columns comprising at least two first longitudinal middle columns and at least one second longitudinal middle column, wherein the first longitudinal middle columns are disposed between an ith first horizontal column and an ith second horizontal column, and the second longitudinal middle column is disposed between the ith second horizontal column and an (i+1)th first horizontal column, wherein $i=1, \ldots,$ and M. The plurality of windings comprise at least two first windings respectively wound around the first longitudinal middle columns, and at least one second winding respectively wound around the second longitudinal middle column; wherein a magnetic flux direction of a DC magnetic flux generated by a current flowing through any one of the windings is opposite to a magnetic flux direction of a DC magnetic flux generated by a current flowing through other one of the windings, on the longitudinal middle column corresponding to the other one of the windings.

Optionally, the magnetic core comprises one longitudinal side column having a plate shape and stacked with the N first horizontal columns in a vertical direction.

Optionally, the magnetic core further comprises a second connection magnetic column connected to a second end of each of the M second horizontal columns.

Optionally, the first connection magnetic column has a plate shape, and is stacked with the M second horizontal columns in a vertical direction.

Optionally, a first air gap is disposed on a first magnetic path from the second horizontal columns to the first horizontal columns via the first longitudinal middle columns; and/or a second air gap is disposed on a second magnetic path from the second horizontal columns to the first horizontal columns via the second longitudinal middle column.

Figure 15A:
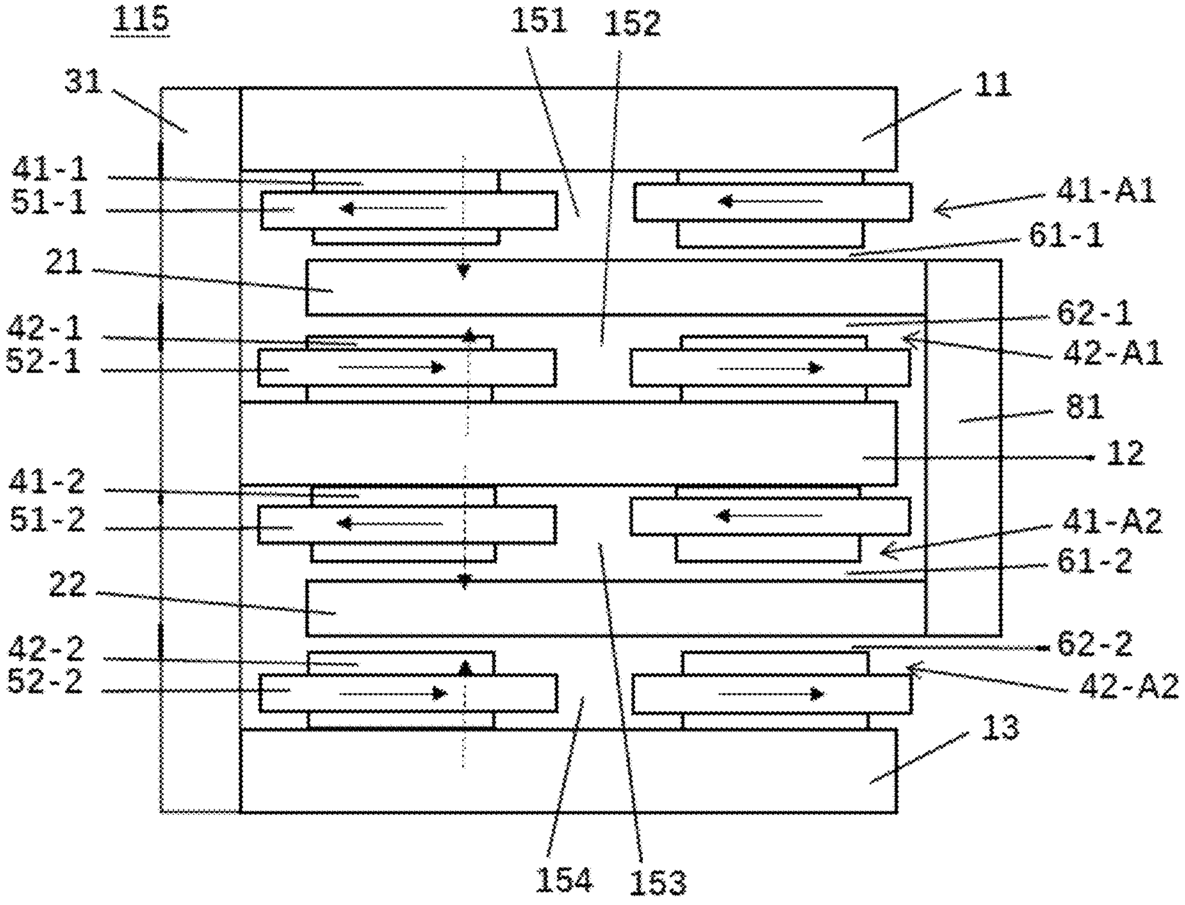
FIG. 15A is a structural diagram of a multi-phase coupled inductor array according to a fifteenth embodiment of the present invention.

FIG. 15A is a structural diagram of a multi-phase coupled inductor array 115 according to a fifteenth embodiment of the present invention. The multi-phase coupled inductor array 115 comprises a magnetic core and a plurality of windings. The magnetic core comprises three first horizontal columns 11, 12 and 13, two second horizontal columns 21 and 22, one longitudinal side column 31, a first connection magnetic column 81, and a plurality of longitudinal middle columns (first longitudinal middle columns 41-1, 41-2, and second longitudinal middle columns 42-1, 42-2). The two second horizontal columns 21, 22 are parallel to, staggered with and spaced apart from the three first horizontal columns 11, 12, 13 to form four windows 151 to 154. The longitudinal side column 31 is connected to the three first horizontal columns 11, 12, 13, such as, connected to first ends of the three first horizontal columns 11, 12, 13. Moreover, the first longitudinal middle column is disposed between the ith first horizontal column and the ith second horizontal column, and the second longitudinal middle column is disposed between the ith second horizontal column and the (i+1)th first horizontal column, wherein i=1, . . . , and 3. Specifically, for example, the first longitudinal middle column 41-1 is disposed between the 1st first horizontal column 11 and the 1st second horizontal column 21, the first longitudinal middle column 41-2 is disposed between the 2nd first horizontal column 12 and the 2nd second horizontal column 22, the second longitudinal middle column 42-1 is disposed between the 1st second horizontal column 21 and the 2nd first horizontal column 12, and the second longitudinal middle column 42-2 is disposed between the 2nd second horizontal column 22 and the 3rd first horizontal column 13.

In this embodiment, the two first longitudinal middle columns 41-1 constitute a first longitudinal middle column array 41-A1, the two first longitudinal middle columns 41-2 constitute a first longitudinal middle column array 41-A2, the two second longitudinal middle columns 42-1 constitute a second longitudinal middle column array 42-A1, and the two second longitudinal middle columns 42-2 constitute a second longitudinal middle column array 42-A2. Moreover, the two first longitudinal middle column arrays 41-A1, 41-A2 and the two second longitudinal middle column arrays 42-A1, 42-A2 that are spaced apart from each other are disposed within the four windows 151 to 154. For example, the first longitudinal middle column array 41-A1 is disposed within the window 151, a first end of the first longitudinal middle column 41-1 of the first longitudinal middle column array 41-A1 is connected to the first horizontal column 11 of the window 151, and a second end of the first longitudinal middle column 41-1 is connected to the second horizontal column 21 of the window 151. The second longitudinal middle column array 42-A1 is disposed within the window 152, a first end of the second longitudinal middle column 42-1 of the second longitudinal middle column array 42-A1 is connected to the first horizontal column 12 of the window 152, and a second end of the second longitudinal middle column 42-1 is connected to the second horizontal column 21 of the window 152. The first longitudinal middle column array 41-A2 is disposed within the window 153, a first end of the first longitudinal middle column 41-2 of the first longitudinal middle column array 41-A2 is connected to the first horizontal column 12 of the window 153, and a second end of the first longitudinal middle column 41-2 is connected to the second horizontal column 22 of the window 153. The second longitudinal middle column array 42-A2 is disposed within the window 154, a first end of the second longitudinal middle column 42-2 of the second longitudinal middle column array 42-A2 is connected to the first horizontal column 13 of the window 154, and a second end of the second longitudinal middle column 42-2 is connected to the second horizontal column 22 of the window 154. It should be understood that in other embodiments, the number of the first longitudinal middle columns 41-1 and 41-2 constituting the first longitudinal middle column arrays 41-A1 and 41-A2 can be one or more, without being limited to two as shown in this embodiment, the number of the second longitudinal middle columns 42-1 and 42-2 constituting the second longitudinal middle column arrays 42-A1 and 42-A2 can be one or more, without being limited to two as shown in this embodiment.

The first connection magnetic column 81 is connected to first ends of the second horizontal columns 21 and 22.

The plurality of windings comprise first windings 51-1 and 51-2 respectively wound around the first longitudinal middle columns 41-1 and 41-2, and second windings 52-1 and 52-2 respectively wound around the second longitudinal middle columns 42-1 and 42-2. Current flowing through the winding generates a magnetic flux. For example, a direction of the current flowing through the first windings 51-1 and 51-2 is the left direction, and the DC magnetic flux generated by the current flowing through the first windings 51-1 and 51-2 has a downward magnetic flux direction (e.g., referred to as first direction) on the first longitudinal middle columns 41-1 and 41-2. A direction of the current flowing through the second windings 52-1 and 52-2 is the right direction, and the DC magnetic flux generated by the current flowing through the second windings 52-1 and 52-2 has an upward magnetic flux direction (e.g., referred to as second direction) on the second longitudinal middle columns 42-1 and 42-2. The first direction is opposite to the second direction. Moreover, a magnetic flux direction of a DC magnetic flux generated by a current flowing through any one of the windings is opposite to a magnetic flux direction of a DC magnetic flux generated by a current flowing through other one of the windings, on the longitudinal middle column corresponding to the other one of the windings. For example, the DC magnetic flux generated by the current flowing through the first winding 51-1 (e.g., towards the left) has a downward magnetic flux direction on the second longitudinal middle column 42-1, which is opposite to the magnetic flux direction (e.g., upward direction), on the corresponding second longitudinal middle column 42-1, of the DC magnetic flux generated by the current flowing through the second winding 52-1. That is, an inductor consisting of the first winding 51-1 and the first longitudinal middle column 41-1 and an inductor consisting of the second winding 52-1 and the second longitudinal middle column 42-1 form a inverse coupling inductor (i.e., inverse coupled with each other). In this embodiment, all of the eight inductors consisting of the eight longitudinal middle columns and the corresponding windings are inverse coupled with each other.

FIG. 15A illustrates that the longitudinal middle columns of the multi-phase coupled inductor may be arranged along an axial direction of the longitudinal middle column to form the coupled inductor having more phases. In the embodiment of FIG. 15A, the multi-phase coupled inductors are arranged in an array having two columns longitudinal middle columns. In other embodiments, the multi-phase coupled inductors may be arranged in an array having, such as, one, three or more columns longitudinal middle columns, but the present invention is not limited thereto. FIG. 15A also illustrates that air gaps 61-1 and 61-2 are disposed between the first longitudinal middle columns 41-1, 41-2 and the second horizontal columns 21, 22, and air gaps 62-1 and 62-2 are disposed between the second longitudinal middle columns 42-1, 42-2 and the second horizontal columns 21, 22, to adjust the inductance amount or saturation current of the respective phases.

Figure 15B:
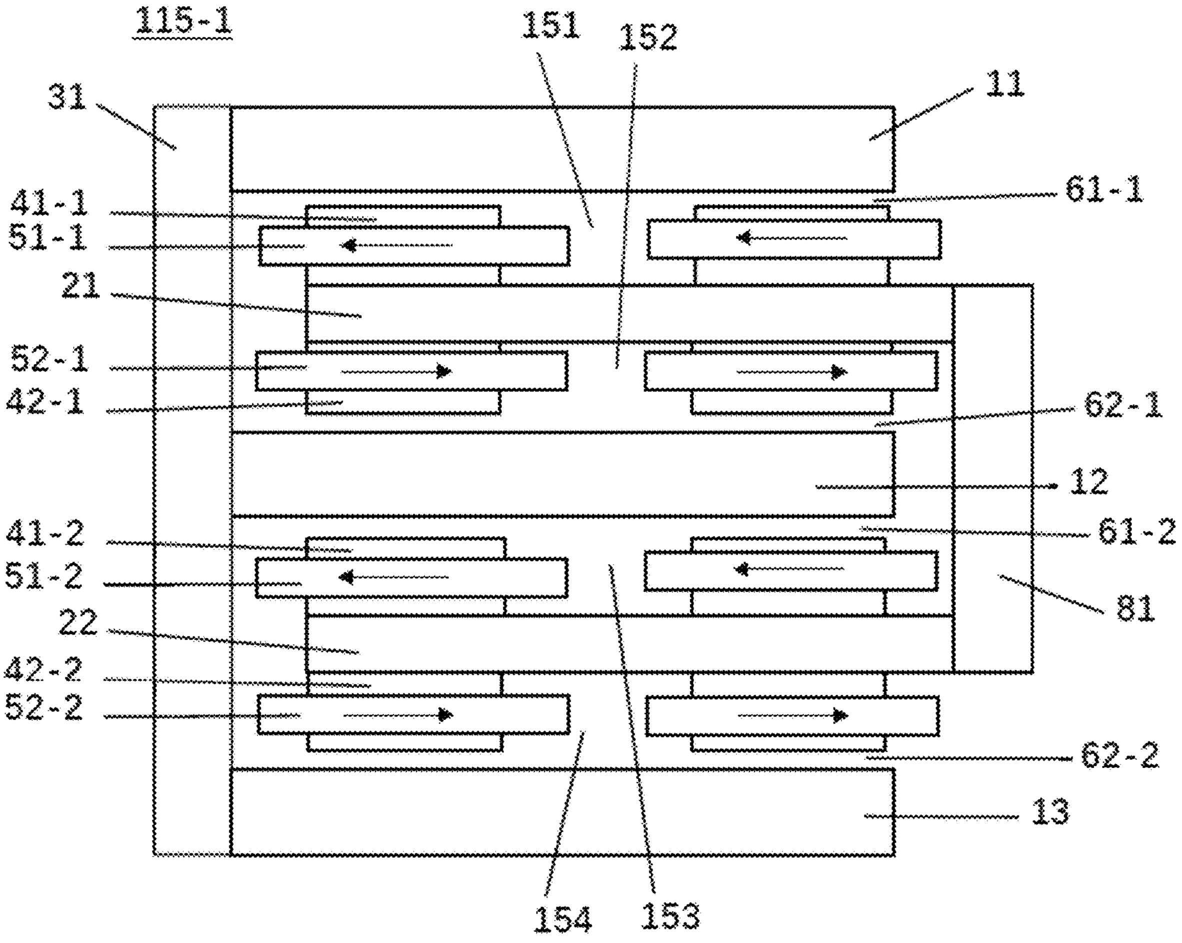
FIG. 15B is a structural diagram of a multi-phase coupled inductor array according to a variable embodiment of the present invention.

FIG. 15B is a structural diagram of a multi-phase coupled inductor array 115-1 according to a variable embodiment of the present invention, which differs from the embodiment of FIG. 15A in that the air gap 61-1 is disposed between the first longitudinal middle columns 41-1 and the first horizontal columns 11, the air gap 61-2 is disposed between the first longitudinal middle column 41-2 and the first horizontal column 12, the air gap 62-1 is disposed between the second longitudinal middle column 42-1 and the first horizontal column 12, and the air gap 62-2 is disposed between the second longitudinal middle column 42-2 and the first horizontal column 13, to adjust the inductance amount or saturation current of the respective phases.

Figure 15C:
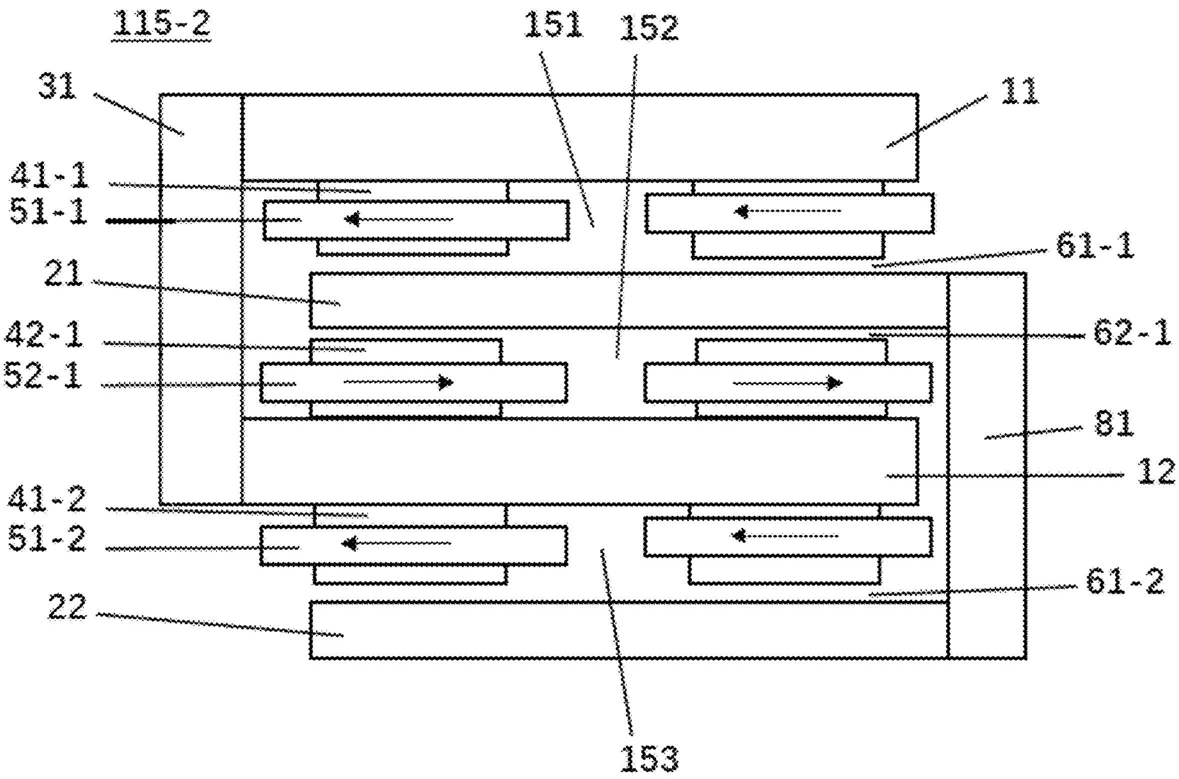
FIG. 15C is a structural diagram of a multi-phase coupled inductor array according to an another variable embodiment of the present invention.

FIG. 15C is a structural diagram of a multi-phase coupled inductor array 115-2 according to an another variable embodiment of the present invention, which differs from the embodiment of FIG. 15A in that the magnetic core comprises two first horizontal columns 11 and 12 staggered with and spaced apart from two second horizontal columns 21 and 22 to form three windows 151 to 153.

Figure 15D:
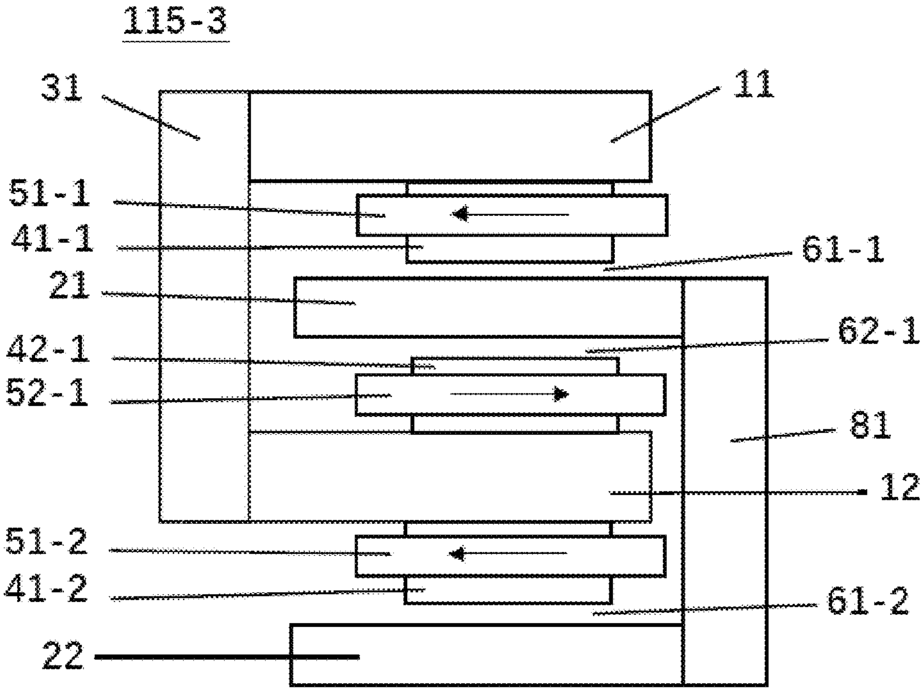
FIG. 15D is a structural diagram of a multi-phase coupled inductor array according to a further variable embodiment of the present invention.

FIG. 15D is a structural diagram of a multi-phase coupled inductor array 115-3 according to a further variable embodiment of the present invention, which differs from FIG. 15C in that, the multi-phase coupled inductor array 115-2 of FIG. 15C comprises multi-phase coupled inductors arranged in an array having two columns longitudinal middle columns, while the multi-phase coupled inductor array 115-3 of FIG. 15D only comprises multi-phase coupled inductors arranged in an array having one column longitudinal middle column.

Figure 16B:
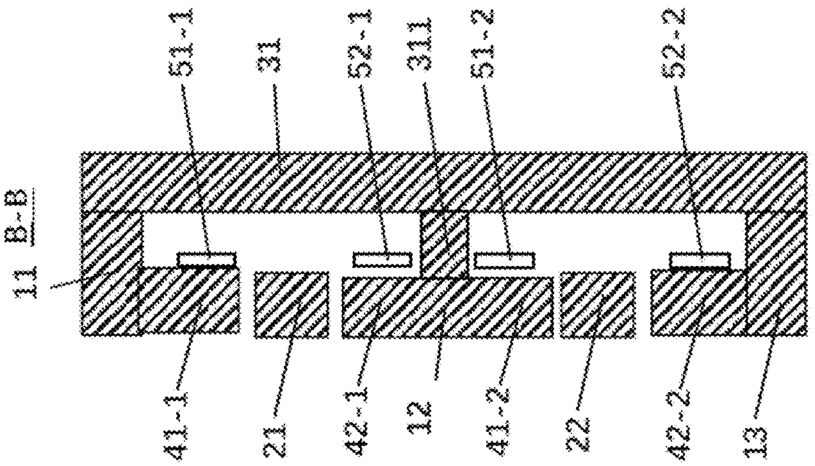
FIG. 16B is a sectional diagram along line B-B in FIG. 16A.
Figure 16A:
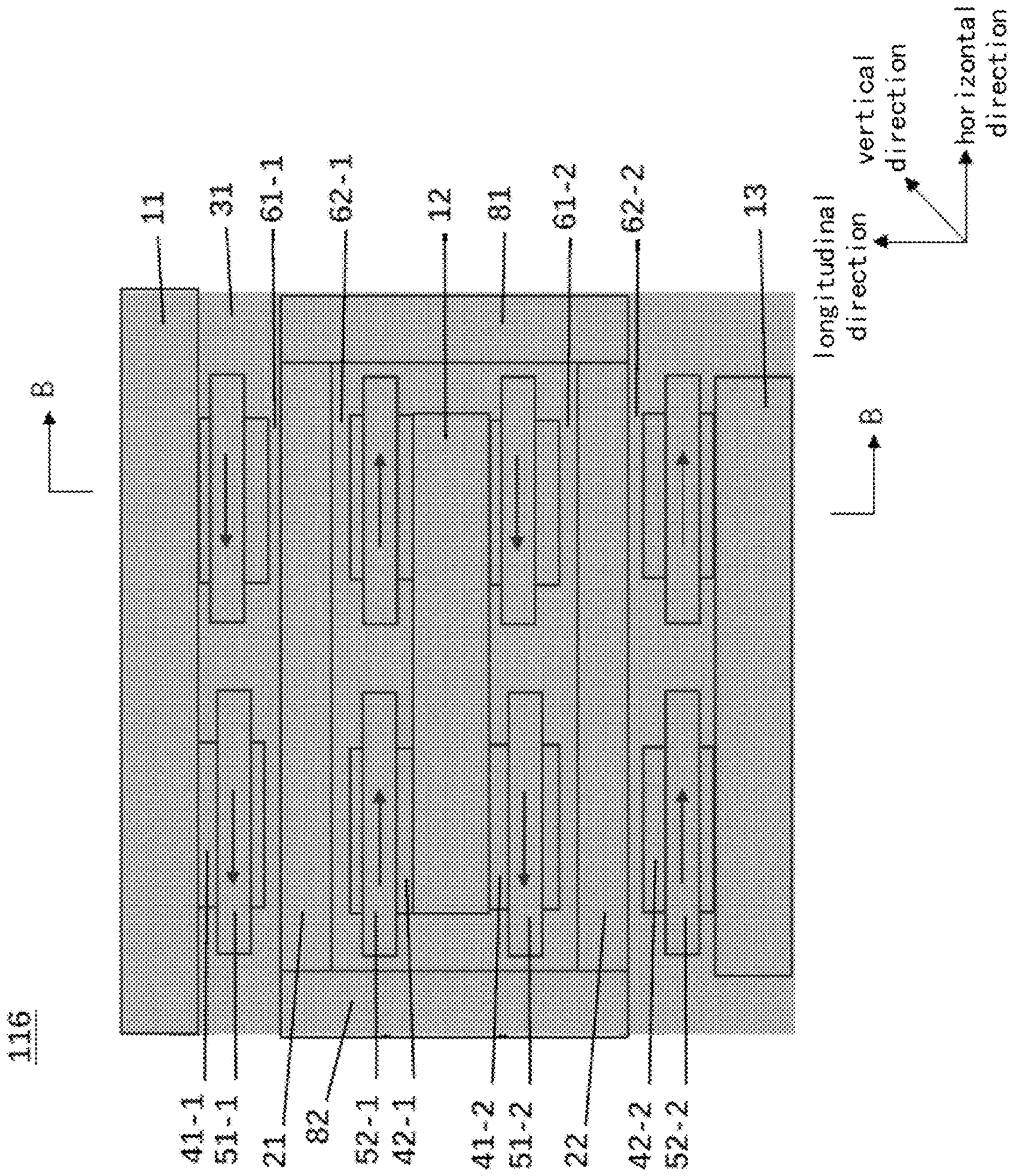
FIG. 16A is a structural diagram of a multi-phase coupled inductor array in which longitudinal side columns are stacked according to a sixteenth embodiment of the present invention.

FIGS. 16A-16B are structural diagrams of a multi-phase coupled inductor array 116 according to a sixteenth embodiment of the present invention, which differ from the embodiment of FIG. 15A in that the longitudinal side column 31 is vertically stacked, such that the second horizontal columns 21 and 22 can be further connected through a second connection magnetic column 82 at the left side of FIG. 16A, which improves the uniformity of inverse coupling between phases, shortens a length of the magnetic path or reduces the magnetic loss. FIG. 16B is a sectional diagram of FIG. 16A, and illustrates that an upper end of the longitudinal side column 31 is connected to the first horizontal column 11, a lower end of the longitudinal side column 31 is connected to the first horizontal column 13, and a central portion of the longitudinal side column 31 may have a protruding part 311 connected to the first horizontal column 12.

Figure 17B:
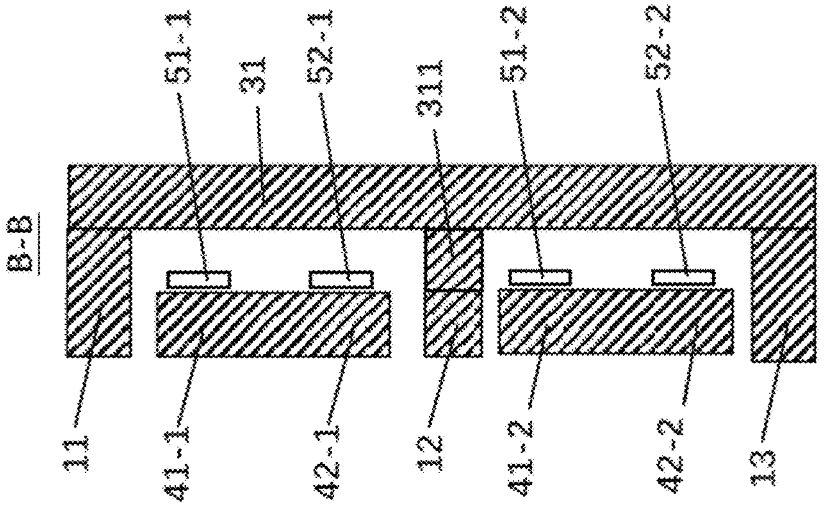
FIG. 17B is a sectional diagram along line B-B in FIG. 17A.
Figure 17A:
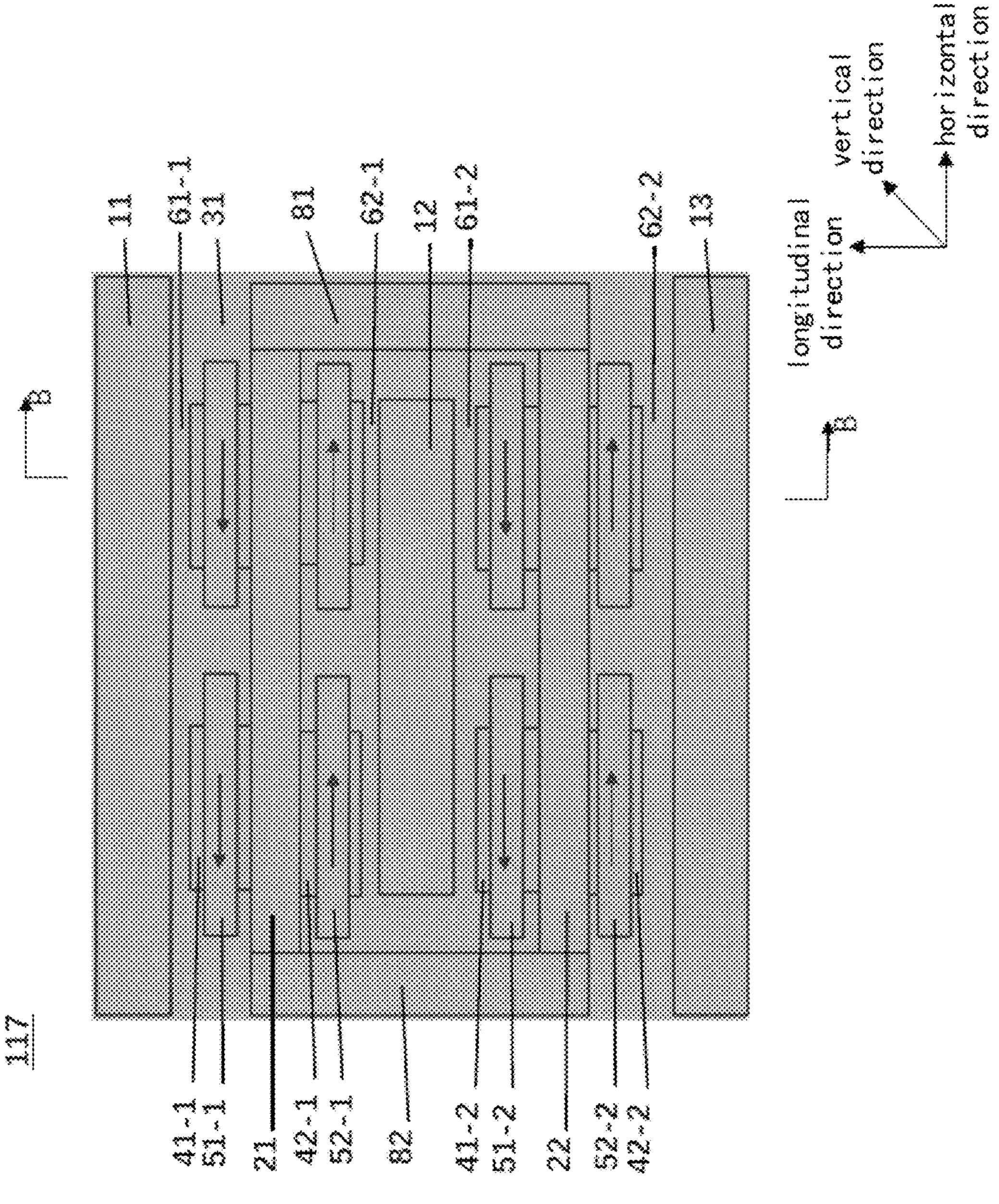
FIG. 17A is a structural diagram of a multi-phase coupled inductor array according to a seventeenth embodiment of the present invention, in which longitudinal side columns are stacked, and positions of air gaps are different from those in the embodiment of FIG. 16A.

FIGS. 17A-17B are structural diagrams of a multi-phase coupled inductor array 117 according to a seventeenth embodiment of the present invention, which differ from the embodiment of FIG. 15B in that the longitudinal side column 31 is vertically stacked, such that the second horizontal columns 21 and 22 can be further connected through a second connection magnetic column 82 at the left side of FIG. 17A, which improves the uniformity of inverse coupling between phases, shortens a length of the magnetic path or reduces the magnetic loss. FIG. 17B is a sectional diagram of FIG. 17A, and illustrates that an upper end of the longitudinal side column 31 is connected to the first horizontal column 11, a lower end of the longitudinal side column 31 is connected to the first horizontal column 13, and a central portion of the longitudinal side column 31 may have a protruding part 311 connected to the first horizontal column 12.

FIG. 17A differs from FIG. 16A in that the first air gap 61-1 on the first longitudinal middle column 41-1 is positioned between the first longitudinal middle column 41-1 and the first horizontal column 11, the first air gap 61-2 on the first longitudinal middle column 41-2 is positioned between the first longitudinal middle column 41-2 and the first horizontal column 12, the second air gap 62-1 on the second longitudinal middle columns 42-1 is positioned between the second longitudinal middle columns 42-1 and the first horizontal columns 12, and the second air gap 62-2 on the second longitudinal middle column 42-2 is positioned between the second longitudinal middle column 42-2 and the first horizontal column 13. In some embodiments, the first longitudinal middle column 41-1, the second longitudinal middle column 42-1, and the second horizontal column 21 can be configured as an integral part, the first longitudinal middle column 41-2, the second longitudinal middle column 42-2, and the second horizontal column 22 can be configured as an integral part. However, in FIG. 16A, the first air gap 61-1 on the first longitudinal middle column 41-1 is positioned between the first longitudinal middle columns 41-1 and the second horizontal column 21, the first air gap 61-2 on the first longitudinal middle column 41-2 is positioned between the first longitudinal middle column 41-2 and the second horizontal column 22, the second air gap 62-1 on the second longitudinal middle columns 42-1 is positioned between the second longitudinal middle columns 42-1 and the second horizontal columns 21, and the second air gap 62-2 on the second longitudinal middle column 42-2 is positioned between the second longitudinal middle column 42-2 and the second horizontal column 22. In some embodiments, the first longitudinal middle column 41-1 and the first horizontal column 11 can be configured as an integral part, the second longitudinal middle column 42-2 and the first horizontal column 13 can be configured as an integral part, and the second longitudinal middle column 42-1, the first longitudinal middle column 41-2 and the first horizontal column 12 can be configured as an integral part.

According to the embodiments, the air gap is away from a sensitive device by adjusting the position of the air gap according to application, so as to reduce the interference, such as EMI and the like. In addition, the longitudinal middle column may be configured as an integral part with the second horizontal column or the first horizontal column according to the process requirement, so as to improve the process and the manufacturability and reduce the cost.

Figure 18B:
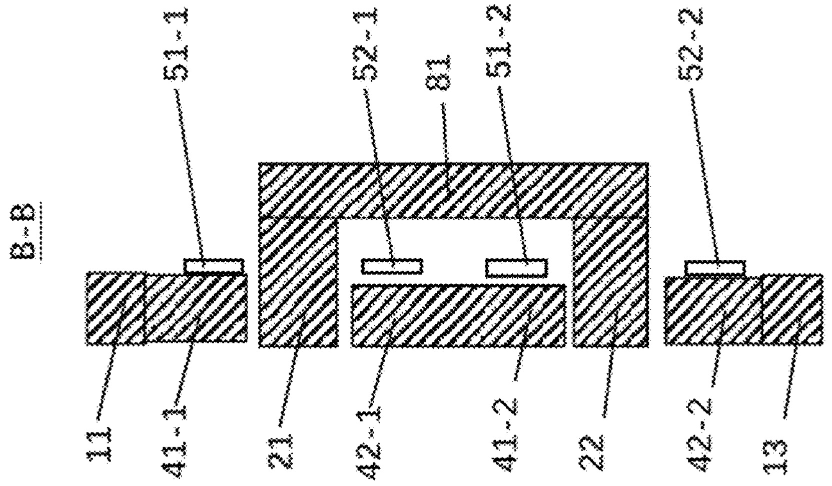
FIG. 18B is a sectional diagram along line B-B in FIG. 18A.
Figure 18A:
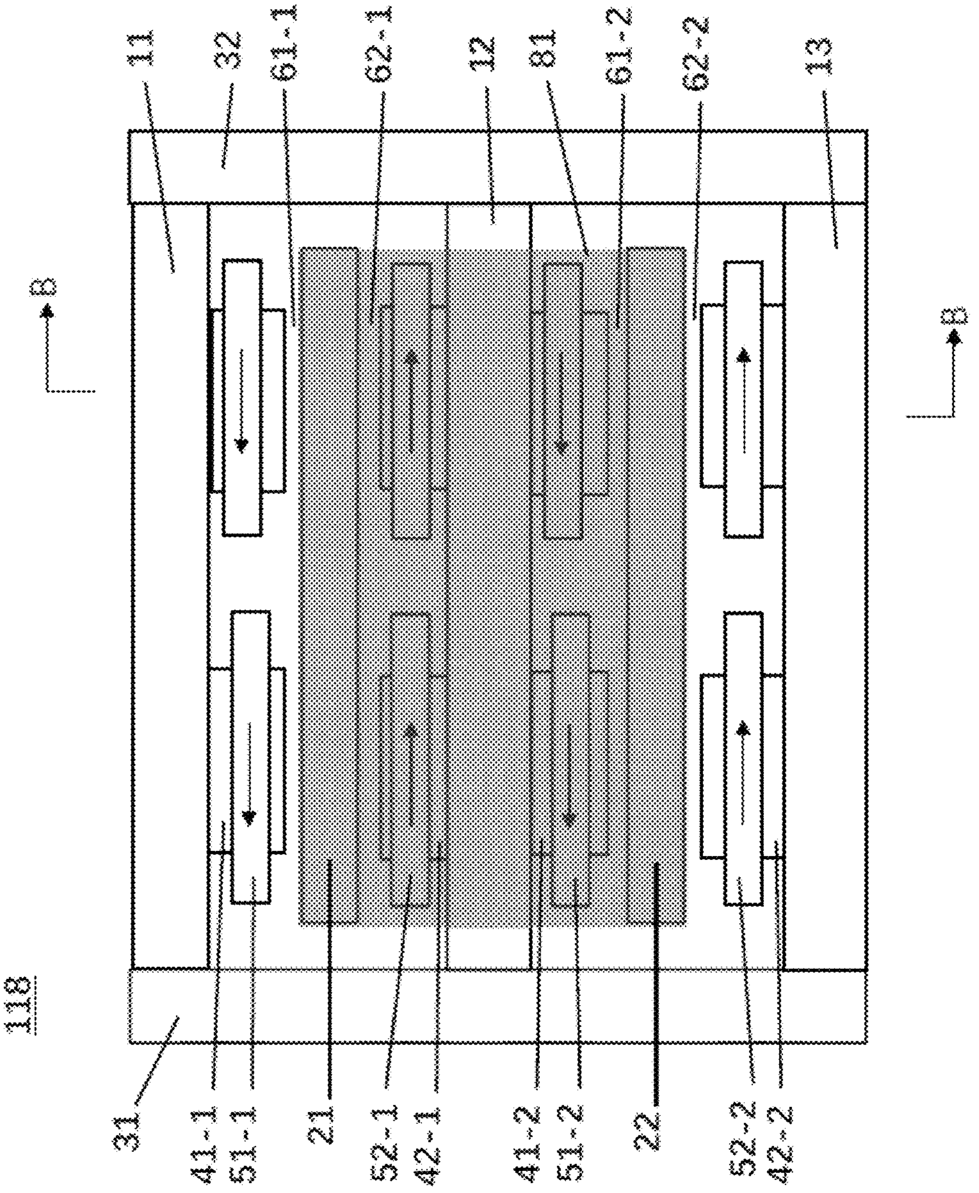
FIG. 18A is a structural diagram of a multi-phase coupled inductor array in which connection magnetic columns are stacked according to an eighteenth embodiment of the present invention.

FIGS. 18A-18B are structural diagrams of a multi-phase coupled inductor array 118 according to an eighteenth embodiment of the present invention, which differ from FIG. 16A or FIG. 17A in that the first connection magnetic column 81 (shown by a grey portion) is a vertically stacked. In FIG. 18A, another longitudinal side column 32 can be further disposed at the right side corresponding to a position of the first connection magnetic column 81 in FIG. 15A, which improves the uniformity of the magnetic resistance of the inverse coupled magnetic path between phases, or reduces the magnetic loss. In FIG. 18B, the first connection magnetic column 81 is stacked with the second horizontal columns 21 and 22 in a vertical direction, and connects the second horizontal columns 21 and 22.

In the embodiment of FIG. 16A, 17A or 18A, the footprint of the multi-phase coupled inductor array can be reduced, the uniformity of the inductance amount of respective phases of the multi-phase coupled inductor array or the uniformity of inverse coupling between phases can be improved, and also the structure, the manufacturing method and the assembling process can be simplified.

Embodiments of the present invention further provides a multi-phase coupled inductor array, comprising a plurality of (at least two) multi-phase coupled inductors 101, 102, 103, 103-1, 103-2, 103-3, 103-4, 104, 104-1, 105, 106, 108, 108-1, 111, 113 and 114 as mentioned above. The plurality of multi-phase coupled inductors are stacked vertically, i.e., the array is extended upwardly or downwardly in the vertical direction.

Optionally, the first horizontal columns 11 and 12 of the plurality of multi-phase coupled inductors 101, 102, 103, 103-1, 103-2, 103-3, 103-4, 104, 104-1, 105, 106, 108, 108-1, 111, 113, and 114 are correspondingly connected together, respectively.

Optionally, the second horizontal column 21 of the plurality of multi-phase coupled inductors 101, 102, 103, 103-1, 103-2, 103-3, 103-4, 104, 104-1, 105, 106, 108, 108-1, 111, 113 and 114 are correspondingly connected together.

Optionally, the longitudinal side columns 31 and 32 of the plurality of multi-phase coupled inductors 101, 102, 103, 103-1, 103-2, 103-3, 103-4, 104, 104-1, 105, 106, 108, 108-1, 111, 113 and 114 are correspondingly connected together, respectively.

Figure 19B:
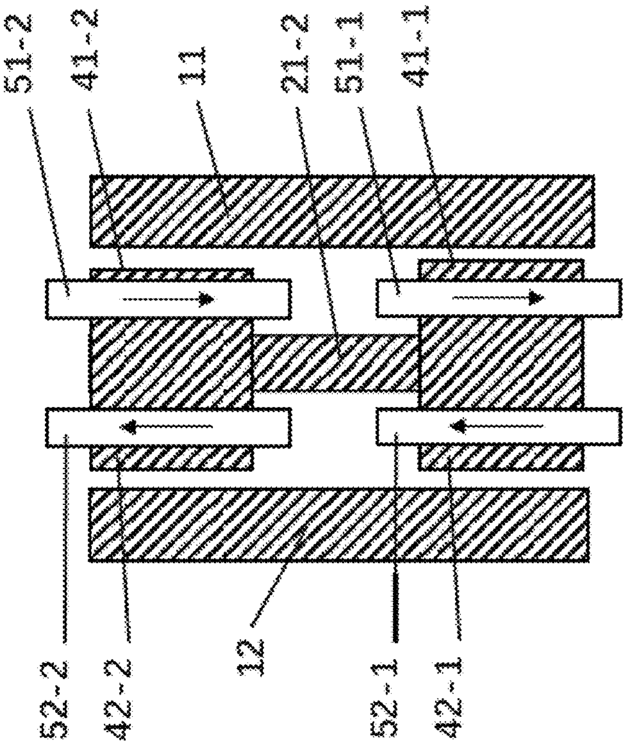
FIG. 19B is a sectional diagram along line A-A in FIG. 19A, in which two multi-phase coupled inductors are stacked in a vertical direction.
Figure 19A:
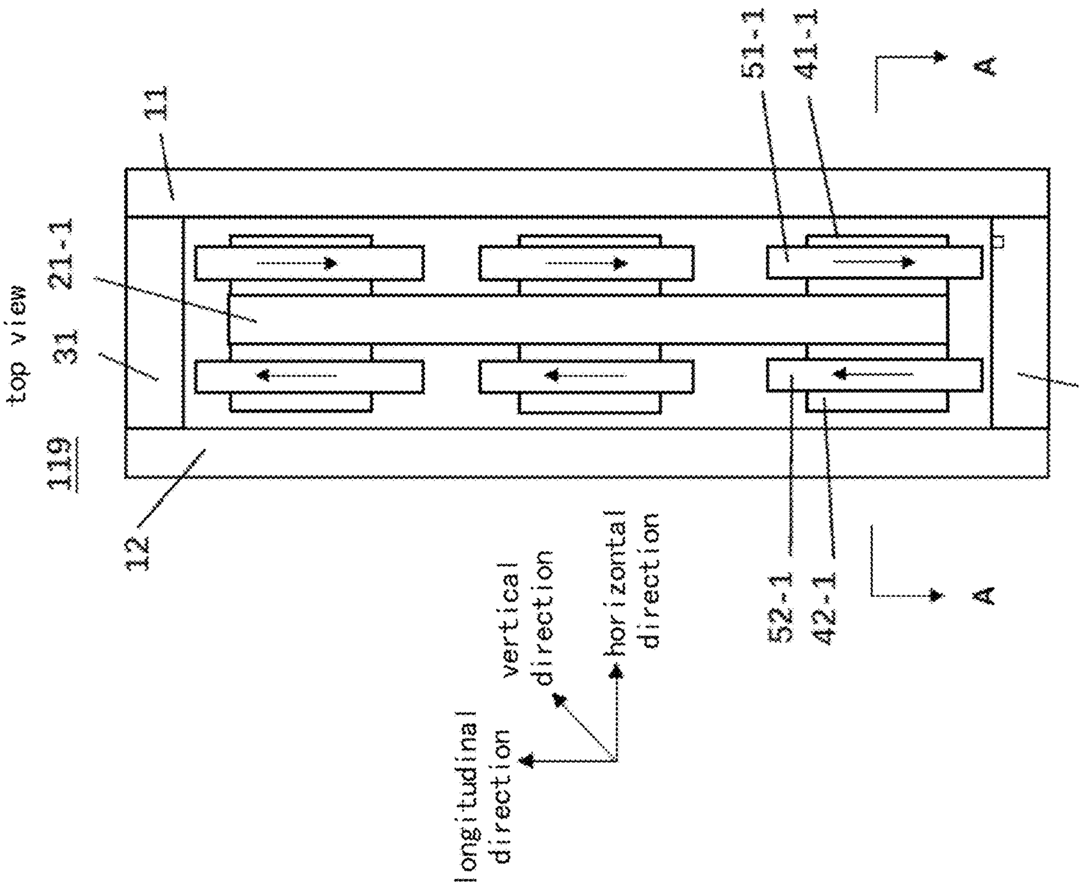
FIG. 19A is a structural diagram of a multi-phase coupled inductor array according to a nineteenth embodiment of the present invention.

FIG. 19A is a structural diagram of a multi-phase coupled inductor array 119 according to a nineteenth embodiment of the present invention, and illustrates that the multi-phase coupled inductors may be stacked vertically in the array to have more phases. FIG. 19A is a top view, and FIG. 19B is a sectional view along line A-A in FIG. 19A. The first longitudinal middle column 41-1 and the second longitudinal middle column 42-1 are stacked vertically above the first longitudinal middle column 41-2 and the second longitudinal middle column 42-2, respectively. The first windings 51-1, 51-2 and the second windings 52-1, 52-2 are wound around the first longitudinal middle columns 41-1, 41-2 and the second longitudinal middle columns 42-1, 42-2, respectively. The first longitudinal middle column 41-1 and the second longitudinal middle column 42-1 are connected to each other through the second horizontal column 21-1, and the first longitudinal middle column 41-1 and the second longitudinal middle column 42-1 are further connected to the first longitudinal middle column 41-2 and the second longitudinal middle column 42-2 through the second horizontal column 21-2. The first longitudinal middle columns 41-1 and 41-2 are connected to each other through the first horizontal column 11, and the second longitudinal middle columns 42-1 and 42-2 are connected to each other through the first horizontal column 12. In such a way, the coupled inductors having more phases can be obtained by stacking the longitudinal middle columns having more phases while minimizing the footprint, such that the power density of the multi-phase coupled inductor can be increased by many times.

Moreover, a magnetic flux direction of a DC magnetic flux generated by a current flowing through any one of the windings is opposite to a magnetic flux direction of a DC magnetic flux generated by a current flowing through other one of the windings, on the longitudinal middle column corresponding to the other one of the windings.

Embodiments of the present invention further provides a multi-phase coupled inductor array, comprising a magnetic core and a plurality of windings. The magnetic core comprises: P longitudinal columns comprising two edge longitudinal columns located in the edge of the magnetic core and a middle longitudinal column located in the middle of the magnetic core, wherein P is a positive integer larger than or equal to 3; N first horizontal columns and M second horizontal columns disposed between adjacent two of the longitudinal columns, wherein $M \leq N \leq (M+1)$, $M \geq 2$, and N and M are both positive integers; the first horizontal columns and the second horizontal columns are spaced apart from each other; the two edge longitudinal columns are connected to and perpendicular to one of the first horizontal columns and the second horizontal columns, respectively, the two edge longitudinal columns are connected to each other at one end through a first horizontal side column, and both sides of the middle longitudinal column are connected to and perpendicular to one of the first horizontal columns and the second horizontal columns, respectively; and a plurality of longitudinal middle columns disposed between adjacent two longitudinal columns, and comprising at least two first longitudinal middle columns and at least one second longitudinal middle column, wherein the first longitudinal middle column is disposed between an ith first horizontal column and an ith second horizontal column, and the second longitudinal middle column is disposed between the ith second horizontal column and an (i+1)th first horizontal column, wherein i=1, . . . , and M. The plurality of windings comprises at least two first windings respectively wound around the at least two first longitudinal middle columns, and at least one second winding respectively wound around the at least one second longitudinal middle column. A magnetic flux direction of a DC magnetic flux generated by a current flowing through any one of the windings is opposite to a magnetic flux direction of a DC magnetic flux generated by a current flowing through other one of the windings, on the longitudinal middle column corresponding to the other one of the windings.

Optionally, the first horizontal columns and the second horizontal columns are spaced apart from each other in a horizontal direction and a longitudinal direction, respectively, and the first horizontal columns are staggered with the second horizontal columns in the longitudinal direction.

Optionally, the two edge longitudinal columns are connected to each other at other end through a second horizontal side column.

Figure 20:
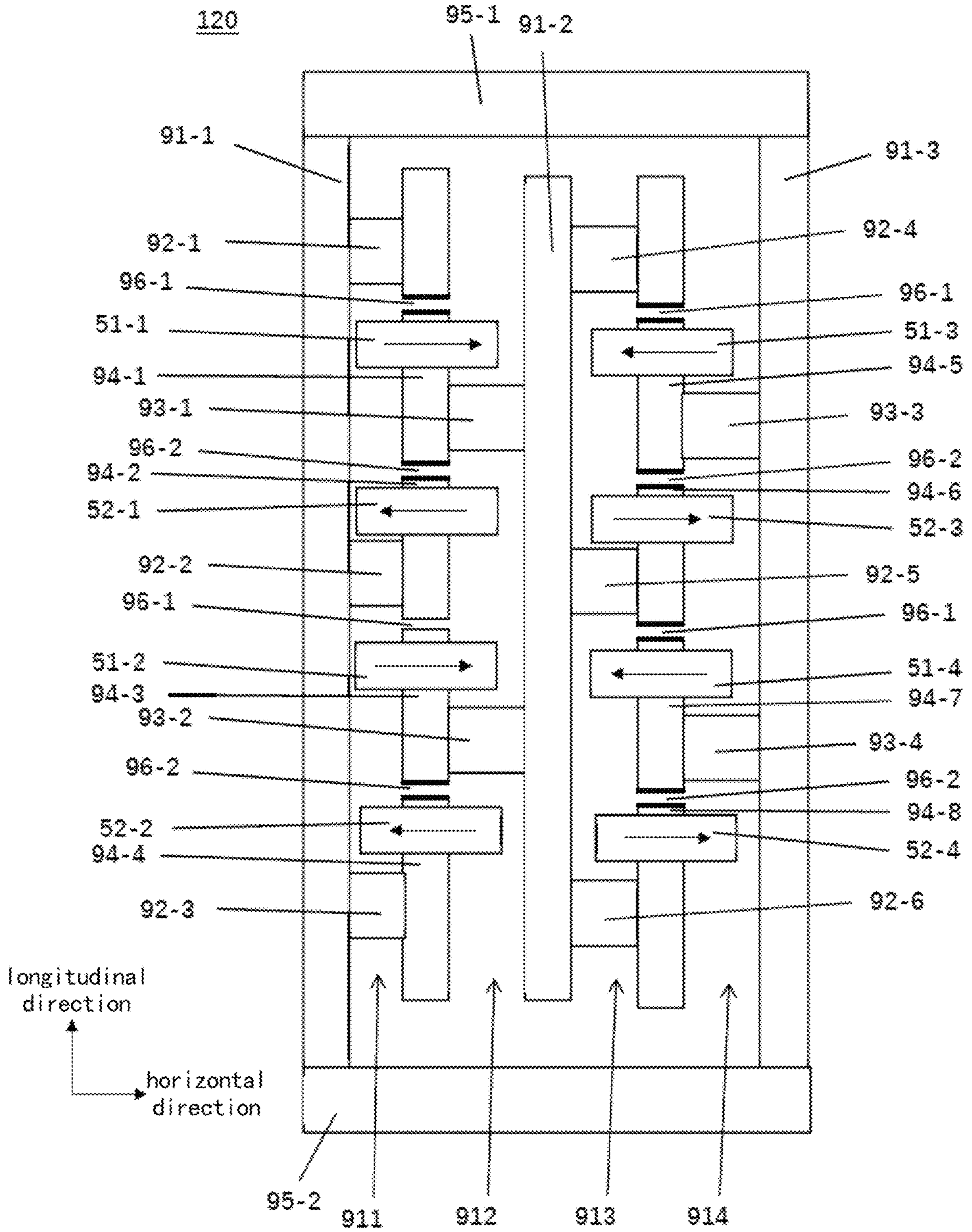
FIG. 20 is a structural diagram of a multi-phase coupled inductor array according to a twentieth embodiment of the present invention.

FIG. 20 is a structural diagram of a multi-phase coupled inductor array 120 according to a twentieth embodiment of the present invention. The multi-phase coupled inductor array 120 comprises a magnetic core and a plurality of windings.

The magnetic core comprises three longitudinal columns 91-1, 91-2 and 91-3, i.e., two edge longitudinal columns 91-1 and 91-3 and one middle longitudinal column 91-2.

The magnetic core further comprises three first horizontal columns 92-1, 92-2, 92-3 and two second horizontal columns 93-1, 93-2 disposed between adjacent two longitudinal columns 91-1 and 91-2, and three first horizontal columns 92-4, 92-5, 92-6 and two second horizontal columns 93-3, 93-4 disposed between adjacent two longitudinal columns 91-2 and 91-3.

The two edge longitudinal columns are connected to and perpendicular to the first horizontal columns and the second horizontal columns, respectively, and both sides of the middle longitudinal column are connected to and perpendicular to the first horizontal columns and the second horizontal columns, respectively. For example, the edge longitudinal column 91-1 is connected to and perpendicular to the three first horizontal columns 92-1, 92-2 and 92-3, the edge longitudinal column 91-3 is connected to and perpendicular to the two second horizontal columns 93-3 and 93-4, one side of the middle longitudinal column 91-2 is connected to and perpendicular to the two second horizontal columns 93-1 and 93-2, and the other side of the middle longitudinal column 91-2 is connected to and perpendicular to the three first horizontal columns 92-4, 92-5 and 92-6.

The first horizontal columns and the second horizontal columns are spaced apart from each other. For example, the three first horizontal columns 92-1, 92-2 and 92-3, the two second horizontal columns 93-1 and 93-2, the three first horizontal columns 92-4, 92-5 and 92-6, and the two second horizontal columns 93-3 and 93-4 are spaced apart from each other in a horizontal direction. That is, the three first horizontal columns 92-1, 92-2 and 92-3, the two second horizontal columns 93-1 and 93-2, the three first horizontal columns 92-4, 92-5 and 92-6, and the two second horizontal columns 93-3 and 93-4 are arranged in a column in the longitudinal direction, respectively, such as, arranged within four longitudinal windows 911 to 914, respectively. Moreover, the three first horizontal columns 92-1, 92-2, 92-3 and the two second horizontal columns 93-1, 93-2 are spaced apart from and staggered with each other in the longitudinal direction, and the three first horizontal columns 92-4, 92-5, 92-6 and the two second horizontal columns 93-3, 93-4 are spaced apart from and staggered with each other in the longitudinal direction.

The magnetic core further comprises a plurality of longitudinal middle columns disposed between adjacent two longitudinal columns, such as, a first group of a plurality of longitudinal middle columns disposed between adjacent two longitudinal columns 91-1 and 91-2, and a second group of a plurality of longitudinal middle columns disposed between adjacent two longitudinal columns 91-2 and 91-3. The first group of the plurality of longitudinal middle columns comprises a first longitudinal middle column 94-1 disposed between a 1st first horizontal column 92-1 and a 1st second horizontal column 93-1, a second longitudinal middle column 94-2 disposed between the 1st second horizontal column 93-1 and a 2nd first horizontal column 92-2, a first longitudinal middle column 94-3 disposed between the 2nd first horizontal column 92-2 and a 2nd second horizontal column 93-2, and a second longitudinal middle column 94-4 disposed between the 2nd second horizontal column 93-2 and a 3rd first horizontal column 92-3. The second group of the plurality of longitudinal middle columns comprises a first longitudinal middle column 94-5 disposed between a 1st first horizontal column 92-4 and a 1st second horizontal column 93-3, a second longitudinal middle column 94-6 disposed between the 1st second horizontal column 93-3 and a 2nd first horizontal column 92-5, a first longitudinal middle column 94-7 disposed between the 2nd first horizontal column 92-5 and a 2nd second horizontal column 93-4, and a second longitudinal middle column 94-8 disposed between the 2nd second horizontal column 93-4 and a 3rd first horizontal column 92-6.

The magnetic core further comprises a first horizontal side column 95-1 connected to first ends of the two edge longitudinal columns 91-1 and 91-3. In other embodiments, the magnetic core may further comprise a second horizontal side column 95-2 connected to second ends of the two edge longitudinal columns 91-1 and 91-3.

The plurality of windings comprise first windings 51-1, 51-2, 51-3 and 51-4 respectively wound around the first longitudinal middle columns 94-1, 94-3, 94-5 and 94-7, and second windings 52-1, 52-2, 52-3 and 52-4 respectively wound around the second longitudinal middle columns 94-2, 94-4, 94-6 and 94-8. Current flowing through the plurality of windings generates a magnetic flux. A direction of the current flowing through the first windings 51-1 and 51-2 is, such as the right direction, and the DC magnetic flux generated by the current flowing through the first windings 51-1 and 51-2 has an upward magnetic flux direction (e.g., referred to as first direction) on the corresponding first longitudinal middle columns 94-1 and 94-3. A direction of the current flowing through the first windings 51-3 and 51-4 is, such as the left direction, and the DC magnetic flux generated by the current flowing through the first windings 51-3 and 51-4 has a downward magnetic flux direction (e.g., referred to as second direction) on the corresponding first longitudinal middle columns 94-5 and 94-7. The first direction is opposite to the second direction. A direction of the current flowing through the second windings 52-1 and 52-2 is, such as the left direction, and the DC magnetic flux generated by the current flowing through the second windings 52-1 and 52-2 has the downward magnetic flux direction (e.g., referred to as second direction) on the corresponding second longitudinal middle columns 94-2 and 94-4. A direction of the current flowing through the second windings 52-3 and 52-4 is, such as the right direction, and the DC magnetic flux generated by the current flowing through the second windings 52-3 and 52-4 has the upward magnetic flux direction (e.g., referred to as first direction) on the corresponding second longitudinal middle columns 94-6 and 94-8. The first direction is opposite to the second direction.

In these windings 51-1 to 51-4 and 52-1 to 52-4, a magnetic flux direction of a DC magnetic flux generated by a current flowing through any one of the windings is opposite to a magnetic flux direction of a DC magnetic flux generated by a current flowing through other one of the windings, on the longitudinal middle column corresponding to the other one of the windings. For example, the magnetic flux direction, on the second longitudinal middle column 94-2, of the DC magnetic flux generated by the current flowing through the first winding 51-1 is the upward direction, which is opposite to the downward magnetic flux direction, on the second longitudinal middle column 94-2, of the DC magnetic flux generated by the current flowing through the second winding 52-1. That is, an inductor consisting of the first winding 51-1 and the first longitudinal middle column 94-1 and an inductor consisting of the second winding 52-1 and the second longitudinal middle column 94-2 form a inverse coupled inductor (i.e., inverse coupled with each other). In this embodiment, all of the eight inductors consisting of the eight longitudinal middle columns and the corresponding windings are inverse coupled with each other.

In the embodiment of FIG. 20, the first longitudinal middle column 94-1, the second longitudinal middle column 94-2, the first longitudinal middle column 94-3 and the second longitudinal middle column 94-4 disposed between the adjacent two longitudinal columns 91-1 and 91-2 are symmetrical with the first longitudinal middle column 94-5, the second longitudinal middle column 94-6, the first longitudinal middle column 94-7 and the second longitudinal middle column 94-8 disposed between the adjacent two longitudinal columns 91-2 and 91-3.

Although FIG. 20 only illustrates the magnetic core comprising two edge longitudinal columns 91-1, 91-3 and one middle longitudinal column 91-2, it should be understood that in other embodiments, the magnetic core may comprise only two edge longitudinal columns, or may comprise more than one middle longitudinal columns, but the invention is not limited thereto.

The present invention may at least have one or more advantages in: (1) arrangement of windings in the array for achieving the multi-phase inverse coupling and the uniformity of the coupling strength and the inductance amount between the phases; (2) a short magnetic path and a small footprint for improving power density and efficiency; (3) suitable for a module of stacked structure and facilitating heat dissipation in a vertical direction; (4) a simple structure and good manufacturability; (5) suitable for both of a ferrite material and a powder core material.

Although the present invention has been described with reference to several exemplary embodiments, it should be understood that the terms used herein are explanatory and exemplary terms, not limiting terms. Since the present invention can be implemented in various forms without departing from spirit or essence of the present invention, it should be understood that the above embodiments are not limited to any foregoing details, but should be explained within the spirit and range defined by the appended claims extensively, so all changes and modifications falling into the range of the claims or their equivalents shall be covered by the appended claims.

What is claimed is:

1. A multi-phase coupled inductor, comprising:

a magnetic core comprising two first horizontal columns, at least one longitudinal side column, at least two first longitudinal middle columns and at least one second longitudinal middle column, the longitudinal side column is connected to the two first horizontal columns, a first end of each of the first longitudinal middle columns is coupled to one of the two first horizontal columns, a first end of the second longitudinal middle column is coupled to other one of the two first horizontal columns, and a second end of each of the first longitudinal middle columns is coupled to a second end of the second longitudinal middle column; and a plurality of windings comprising at least two first windings respectively wound around the at least two first longitudinal middle columns, and at least one second winding respectively wound around the at least one second longitudinal middle column, wherein a magnetic flux direction of a DC magnetic flux generated by a current flowing through any one of the windings is opposite to a magnetic flux direction of a DC magnetic flux generated by a current flowing through other one of the windings, on a longitudinal middle column among the at least two first longitudinal middle columns and at least one second longitudinal middle column, around which the other one of the windings is wound.

2. The multi-phase coupled inductor of claim 1, wherein the magnetic core comprises two longitudinal side columns symmetrically disposed at left and right ends of the two first horizontal columns.

3. The multi-phase coupled inductor of claim 1, wherein the magnetic core further comprises a second horizontal column disposed between the two first horizontal columns, and the second end of each of the first longitudinal middle columns is coupled to the second end of the second longitudinal middle column through the second horizontal column.

4. The multi-phase coupled inductor of claim 3, wherein, a first air gap is disposed on a first magnetic path from the second horizontal column to the one of the two first horizontal columns via the first longitudinal middle columns, and/or a second air gap is disposed on a second magnetic path from the second horizontal column to the other one of the two first horizontal columns via the second longitudinal middle column.

5. The multi-phase coupled inductor of claim 3, wherein the magnetic core further comprises:

a first decoupling column connected to the second horizontal column and disposed between the two first horizontal columns, wherein a third air gap is disposed on a third magnetic path from the second horizontal column to the two first horizontal columns via the first decoupling column; and/or a second decoupling column connected to the second horizontal column and disposed between the at least one longitudinal side column and the second horizontal column, wherein a fourth air gap is disposed on a fourth magnetic path from the second horizontal column to the at least one longitudinal side column via the second decoupling column.

6. The multi-phase coupled inductor of claim 3, wherein a magnetic permeability of each of the first longitudinal middle columns and the second longitudinal middle column is smaller than a magnetic permeability of at least one of other portions of the magnetic core.

7. The multi-phase coupled inductor of claim 3, wherein the magnetic core further comprises a decoupling plate stacked with the two first horizontal columns in a vertical direction, and the vertical direction is orthogonal to a horizontal direction and a longitudinal direction, and wherein:

a fifth air gap is disposed between the decoupling plate and the two first horizontal columns; and/or a sixth air gap is disposed between the decoupling plate and the at least one longitudinal side column; and/or a seventh air gap is disposed between the decoupling plate and the second horizontal column.

8. The multi-phase coupled inductor of claim 3, wherein the at least two first longitudinal middle columns and the at least one second longitudinal middle column are aligned with each other with respect to the second horizontal column.

9. The multi-phase coupled inductor of claim 1, wherein the magnetic core comprises one longitudinal side column having a plate shape, and the longitudinal side column is stacked with the two first horizontal columns in a vertical direction, wherein the one of the two first horizontal columns is connected between the longitudinal side column and the first longitudinal middle columns, and the other one of the two first horizontal columns is connected between the longitudinal side column and the second longitudinal middle column.

10. The multi-phase coupled inductor of claim 1, wherein, terminals on both ends of each of the first windings are extended to an upper surface and a lower surface of the magnetic core in a vertical direction, respectively; and/or terminals on both ends of the second winding are extended to the upper surface and the lower surface of the magnetic core in the vertical direction, respectively.

11. The multi-phase coupled inductor of claim 1, wherein among the plurality of windings, terminals of at least one of the windings are extended to an upper surface of the magnetic core in a vertical direction, and terminals of at least one of the windings are extended to a lower surface of the magnetic core in the vertical direction.

12. A multi-phase coupled inductor array, comprising a plurality of multi-phase coupled inductors of claim 1, wherein, the plurality of multi-phase coupled inductors are stacked in a vertical direction, first horizontal columns of the plurality of multi-phase coupled inductors are correspondingly connected together; and/or second horizontal columns of the plurality of multi-phase coupled inductors are correspondingly connected together; and/or longitudinal side columns of the plurality of multi-phase coupled inductors are correspondingly connected together.

13. A multi-phase coupled inductor array, comprising:

a magnetic core, comprising:

N first horizontal columns;

M second horizontal columns parallel to and staggered with the N first horizontal columns, wherein $M \leq N \leq (M+1)$, $M \geq 2$, and N and M are both positive integers;

at least one longitudinal side column connected to first ends of the N first horizontal columns;

a first connection magnetic column connected to first ends of the M second horizontal columns; and at least two first longitudinal middle columns and at least one second longitudinal middle column, wherein each of the first longitudinal middle columns is disposed between an ith first horizontal column and an ith second horizontal column, and the second longitudinal middle column is disposed between the ith second horizontal column and an (i+1)th first horizontal column, wherein i=1, . . . , and M; and a plurality of windings comprising at least two first windings respectively wound around the first longitudinal middle columns and at least one second winding respectively wound around the at least one second longitudinal middle column, wherein a magnetic flux direction of a DC magnetic flux generated by a current flowing through any one of the windings is opposite to a magnetic flux direction of a DC magnetic flux generated by a current flowing through other one of the windings, on a longitudinal middle column among the at least two first longitudinal middle columns and at least one second longitudinal middle column, around which the other one of the windings is wound.

14. The multi-phase coupled inductor array of claim 13, wherein the magnetic core comprises one longitudinal side column having a plate shape and stacked with the N first horizontal columns in a vertical direction, and a second connection magnetic column connected to a second end of each of the M second horizontal columns.

15. The multi-phase coupled inductor array of claim 13, wherein the first connection magnetic column has a plate shape and is stacked with the M second horizontal columns in a vertical direction.

* * * * *